US012541259B2

(12) United States Patent
Kober

(10) Patent No.: US 12,541,259 B2
(45) Date of Patent: Feb. 3, 2026

(54) GROUND TRACKING THROUGH CURRENT COMPENSATION FOR BIOSENSING SYSTEMS

(71) Applicant: Meta Platforms Technologies, LLC, Menlo Park, CA (US)

(72) Inventor: Steven Joseph Kober, New Canaan, CT (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

(21) Appl. No.: 18/584,310

(22) Filed: Feb. 22, 2024

(65) Prior Publication Data

US 2024/0288958 A1  Aug. 29, 2024

Related U.S. Application Data

(60) Provisional application No. 63/486,651, filed on Feb. 23, 2023.

(51) Int. Cl.
G06F 3/038 (2013.01)
G06F 3/01 (2006.01)

(52) U.S. Cl.
CPC .............. G06F 3/038 (2013.01); G06F 3/015 (2013.01)

(58) Field of Classification Search
CPC .................. G06F 3/038; G06F 3/015
See application file for complete search history.

(56) References Cited

U.S. PATENT DOCUMENTS

| 5,704,351 | A | * | 1/1998 | Mortara | A61B 5/0006 600/382 |
| 5,807,258 | A | * | 9/1998 | Cimochowski | A61M 1/3656 128/903 |
| 9,606,682 | B2 | * | 3/2017 | Walley | G06F 3/03545 |
| 2009/0264776 | A1 | * | 10/2009 | Vardy | A61B 5/0537 600/506 |
| 2015/0124566 | A1 | * | 5/2015 | Lake | G06F 3/011 368/10 |
| 2016/0113540 | A1 | * | 4/2016 | Chi | A61B 5/6843 600/509 |
| 2018/0366081 | A1 | * | 12/2018 | Jangda | G09G 3/3655 |
| 2023/0376151 | A1 | * | 11/2023 | Zerbe | G06F 3/0416 |

* cited by examiner

Primary Examiner — Mihir K Rayan
(74) Attorney, Agent, or Firm — Morgan, Lewis & Bockius LLP

(57) ABSTRACT

Methods and systems for ground tracking and current compensation for biosensing systems are described. In one aspect, a wearable device includes a wearable structure configured to be worn by a user, the wearable structure having an interior surface and an exterior surface, the interior surface being configured to face a user's skin while the wearable device is being worn by the user. The wearable device further includes an electrode at a first position on the interior surface, the electrode configured to detect biopotential signals of the user; and a reference electrode at a second position on the interior surface. The wearable device is configured to (i) measure, via the reference electrode, a difference between a ground potential of the wearable device and a body potential of the user, and (ii) compensate for the difference in processing of the biopotential signals detected by the electrode.

20 Claims, 20 Drawing Sheets

```
514 Detect, via an additional electrode, additional biopotential signals from another
biopotential pathway of the user Compensate for the difference in processing of the additional biopotential signals
using the circuitry
```

```
516 Provide a compensation current from the circuitry to the user via a
compensation electrode
```

```
518 Identify environmental interference based on a value of the difference
```

```
520 Notify the user of the identified environmental interference
```

Figure 5B

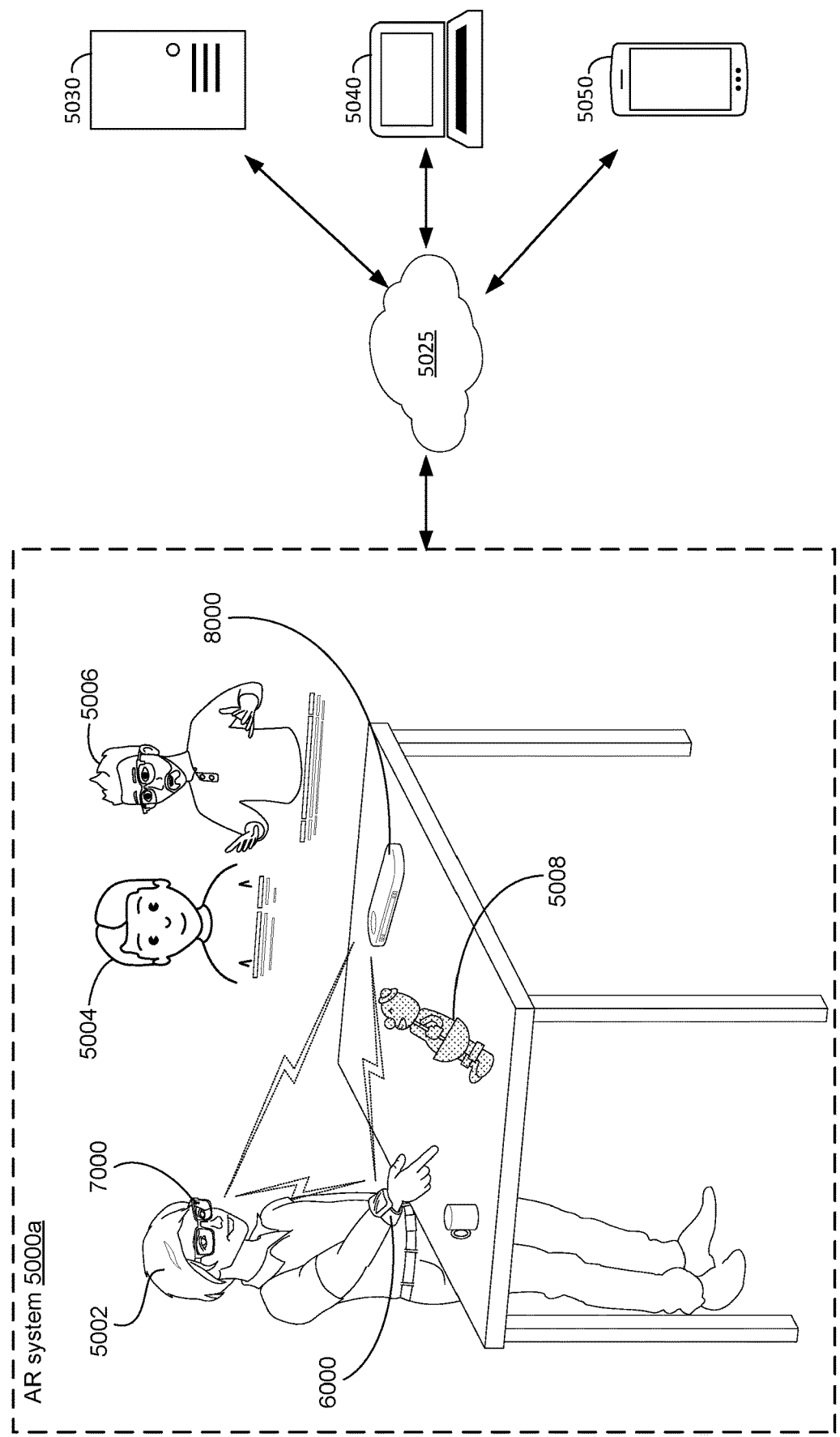

GROUND TRACKING THROUGH CURRENT COMPENSATION FOR BIOSENSING SYSTEMS

PRIORITY AND RELATED APPLICATIONS

This application claims priority to U.S. Provisional Patent Application No. 63/486,651, entitled "Ground Tracking Through Current Compensation for Biosensing Systems" filed Feb. 23, 2023, which is hereby incorporated by reference in its entirety.

TECHNICAL FIELD

The present disclosure relates generally to systems and methods for biosensing, including but not limited to methods and circuits for ground tracking and current compensation in biosensing systems.

BACKGROUND

Biosensing applications, such as electromyography (EMG) and electrocardiography (ECG), detect and interpret small electrical signals in the body. In battery-powered biosensing applications, external interference and noise can cause a device's ground potential to deviate from the potential of the body. The external interference/noise can be particularly challenging for devices using dry electrodes (e.g., electrodes that operate without gel, adhesive, or skin preparation).

External interference/noise can cause a number of problems, including circuits and components not behaving as intended. If the circuit ground deviates from the user's body voltage, common mode interference can be transformed to differential voltage (e.g., through electrode-skin impedance mismatches) and propagated through the system superimposed on the target biological signal (sometimes referred to as a "biosignal").

SUMMARY

Tracking a circuit ground with a user's body voltage (sometimes referred to as "ground tracking") allows for rejection of unintended interference. Improved ground tracking can reduce and/or eliminate the impact of interference through specific coupling paths. The circuits and devices described herein reduce and/or eliminate currents that are generated from non-ideal sources (e.g., operational amplifier bias currents and/or external interference sources). For example, the present disclosure describes using a ground electrode to sense currents from interference sources and provide a current of equal but opposite direction. When the voltage across a ground electrode is zero, the body potential and circuit common potential are the same (e.g., the ground tracking is perfect). This is important for preventing the noise from coupling into the sensing circuit.

The present disclosure describes current-compensation circuits for reducing and/or eliminating the current from noise sources. For example, a current-compensation circuit of the present disclosure senses the current from noise sources using a current sense resistor and provides that information (e.g., a current or voltage) to a control circuit (e.g., a proportional-integral (PI) controller) that is configured to move/maintain the voltage across the current sense resistor to zero volts. The current-compensation circuits described herein include integral, proportional-integral, and proportional-integral-derivative controllers. The current-compensation circuits described herein can reduce and/or eliminate the voltage potential across the current sense resistor by providing a reverse current that flows from a second electrode to the user's body to the ground electrode and the current sense resistor. This reverse current cancels the current from noise sources and brings the body potential and circuit common potential closer to one another. In some embodiments, a buffer is positioned between the current sense resistor and compensation circuit in order to cause the compensation current to flow through the user's body to the ground electrode and current sense resistor.

In accordance with some embodiments, a wearable device is provided for biosensing. The wearable device includes (i) a wearable structure configured to be worn by a user, the wearable structure having an interior surface and an exterior surface, the interior surface being configured to face a user's skin while the wearable device is being worn by the user; (ii) an electrode at a first position on the interior surface, the electrode configured to detect biopotential signals (or other types of biosignals) of the user; and (iii) a reference electrode at a second position on the interior surface. The wearable device is configured to (a) measure, via the reference electrode, a difference between a ground potential of the wearable device and a body potential of the user and (b) compensate for the difference in processing of the biopotential signals detected by the electrode.

In accordance with some embodiments, a device is provided for biosensing. The device includes (i) an electrode at a first position on a surface of the device, the electrode configured to detect biopotential signals; (ii) a reference electrode at a second position on the surface; (iii) means for measuring, via the reference electrode, a difference between a ground potential of the device and a body potential of a user; and (iv) means for compensating for the difference in processing of the biopotential signals detected by the electrode.

In accordance with some embodiments, circuitry is provided for active ground tracking. The circuitry includes: (i) means for obtaining one or more biopotential signals from an electrode of a device; (ii) means for processing the one or more biopotential signals to identify a motor action intended by a user of the device; and (iii) means for active ground tracking in the processing of the one or more biopotential signals.

In accordance with some embodiments, a method is provided for reducing noise in biosensing. The method is performed at a wearable device having (i) a wearable structure configured to be worn by a user, the wearable structure having an interior surface and an exterior surface; (ii) an electrode at a first position on the interior surface; (iii) a reference electrode at a second position on the interior surface; and (iv) circuitry. The method includes (a) detecting, via the electrode, biopotential signals from a biopotential pathway of the user; (b) measuring, via the circuitry, an electrical property at the reference electrode, the electrical property representing a difference between a ground potential of the wearable device and a body potential of the user; and (c) compensating, via the circuitry, in processing of the detected biopotential signals for the difference.

In some embodiments, a computing device (e.g., a wrist-wearable device or a head-mounted device, or an intermediary device, such as a smartphone or desktop or laptop computer) includes one or more processors, memory, a display (in some embodiments the display can be optional, such as for certain example intermediary devices that can coordinate operations at the wrist-wearable device and the head-mounted device, and thus have ample processing and power resources, but need not have its own display), and one or more programs stored in the memory. The programs are configured for execution by the one or more processors. The one or more programs include instructions for performing (or causing performance of) any of the methods described herein.

In some embodiments, a non-transitory computer-readable storage medium stores one or more programs configured for execution by a computing device (e.g., a wrist-wearable device or a head-mounted device, or an intermediary device such as a smartphone or desktop or laptop computer that can be configured to coordinate operations at the wrist-wearable device and/or the head-mounted device) having one or more processors and memory. The one or more programs include instructions for performing (or causing performance of) any of the methods described herein.

Thus, methods, systems, and computer-readable storage media are disclosed for providing biosensing. Such methods and systems may complement or replace conventional methods for providing biosensing.

The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIGS. 5A-5B are flow diagrams illustrating an example method for ground tracking in accordance with some embodiments.

FIGS. 6A, 6B, 6C-1, 6C-2, 6D-1, and 6D-2 illustrate example AR systems in accordance with some embodiments.

FIGS. 8A, 8B-1, 8B-2, and 8C illustrate example artificial-reality systems in accordance with some embodiments.

In accordance with common practice, the various features illustrated in the drawings are not necessarily drawn to scale, and like reference numerals can be used to denote like features throughout the specification and figures.

DETAILED DESCRIPTION

As discussed above, ground tracking is important for biosensing devices and other devices configured to detect and/or interpret small electrical signals. The present disclosure includes devices and circuits configured to perform ground tracking in biosensing systems. An example wearable device (e.g., a wristband or smartwatch) includes one or more sensing electrodes, a reference electrode, and circuitry that includes a current-sensing component and a current-compensation component. In this example, a difference between a ground potential of the wearable device and a body potential of the user is measured directly using the reference electrode and a compensation current is generated to reduce and/or eliminate the difference. This compensation current can improve the accuracy and/or precision of the biosensing system (e.g., reducing noise in the biosignals).

The present disclosure also describes monitoring an output of the compensation circuit to determine an amount of compensation being performed at a given time or in a given situation. In this way, a measure can be obtained for the noisiness of the user's environment. The biosensing systems of the present disclosure can also provide an output to the user regarding the noisiness and recommendations or instructions for reducing the noise (e.g., moving away from a nearby electronic device or power supply).

The circuits and devices described herein sense the difference between a ground potential of the device and a body potential of the user directly (e.g., using a reference electrode). Some conventional biosensing systems rely on a right leg drive (RLD) circuit (also sometimes called a "driven right leg circuit") to reduce noise. An RLD circuit measures effects of external interference indirectly by measuring a current or voltage associated with an analog front end (AFE) of the biosensing system (e.g., measuring an output of a first stage of processing). Ground tracking solutions in the present disclosure can decouple noise measurement and compensation circuitry from the AFE and biosignal processing circuitry, which can provide more accurate and precise compensation and information regarding frequencies affected and effects of the compensation.

A ground tracking circuit that is separate from (e.g., independent of) the analog front end (e.g., biosignal-sensing circuitry), as described herein, is more modular and has more system integration flexibility. The ground tracking circuits described herein also allow for a stable, low-impedance reference (e.g., stable with respect to both circuit ground and the body voltage). The ground tracking circuits described herein allow for a shielding component to be connected to an electrical ground node, or other low-impedance node. The ground tracking circuits described herein can be used to improve stability of biosensing systems that sense small voltages from the surface of the skin (ECG).

Figure 1B:
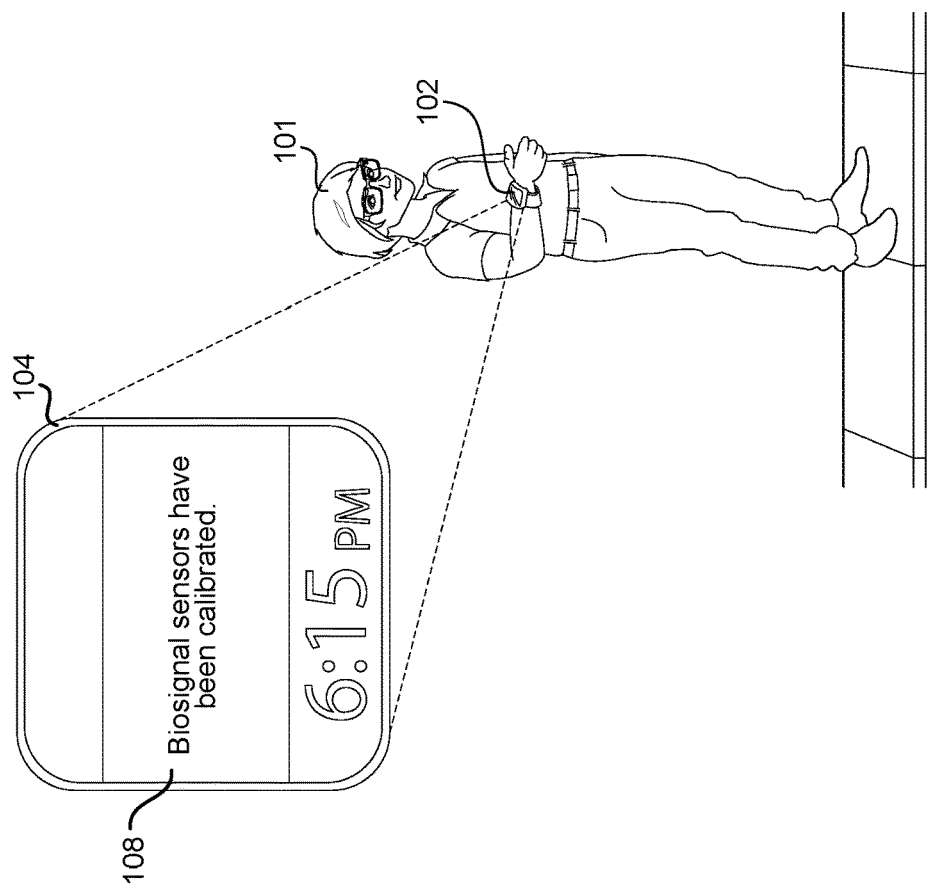
FIGS. 1A-1B illustrate an example user scenario of interacting with a wearable device in accordance with some embodiments.
Figure 1A:
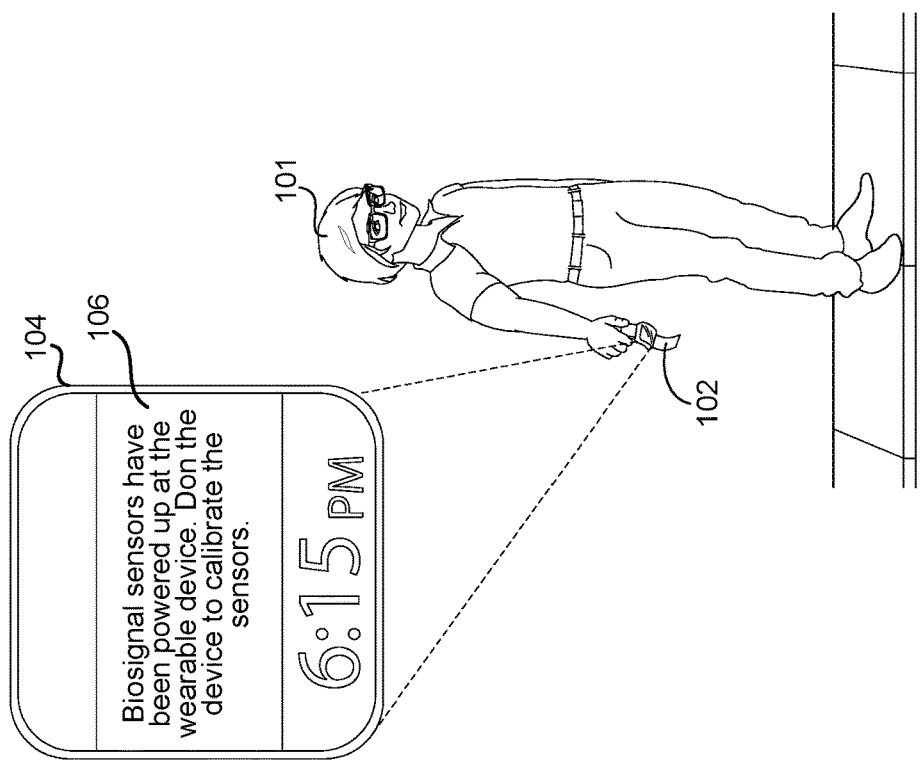

Turning now to the figures, FIGS. 1A-1B illustrate an example user scenario of interacting with a wearable device in accordance with some embodiments. FIG. 1A shows a user 101 holding a wearable device 102 (e.g., a wrist-wearable device). The wearable device 102 in FIG. 1A includes a display 104 showing a message 106 indicating that biosignal sensors of the device are powered up and awaiting calibration. In some embodiments, the biosignal sensors are provided power in accordance with the user 101 activating a power switch or button at the wearable device 102. In some embodiments, the biosignal sensors are provided power in accordance with a determination that the user 101 is wearing the wearable device 102.

FIG. 1B shows the user 101 wearing the wearable device 102. The wearable device 102 in FIG. 1B shows a message 108 on the display 104. The message 108 indicates that the biosignal sensors of the wearable device 102 have been calibrated (e.g., ground tracking is active). In some embodiments, the calibration includes enabling a ground tracking circuit to match a potential of the wearable device 102 with a body potential of the user 101. In some embodiments, the calibration is performed in accordance with the user 101 wearing the wearable device 102. In some embodiments, the calibration is performed in accordance with the user 101 activating a function of the wearable device 102 while the wearable device 102 is being worn.

Figure 2:
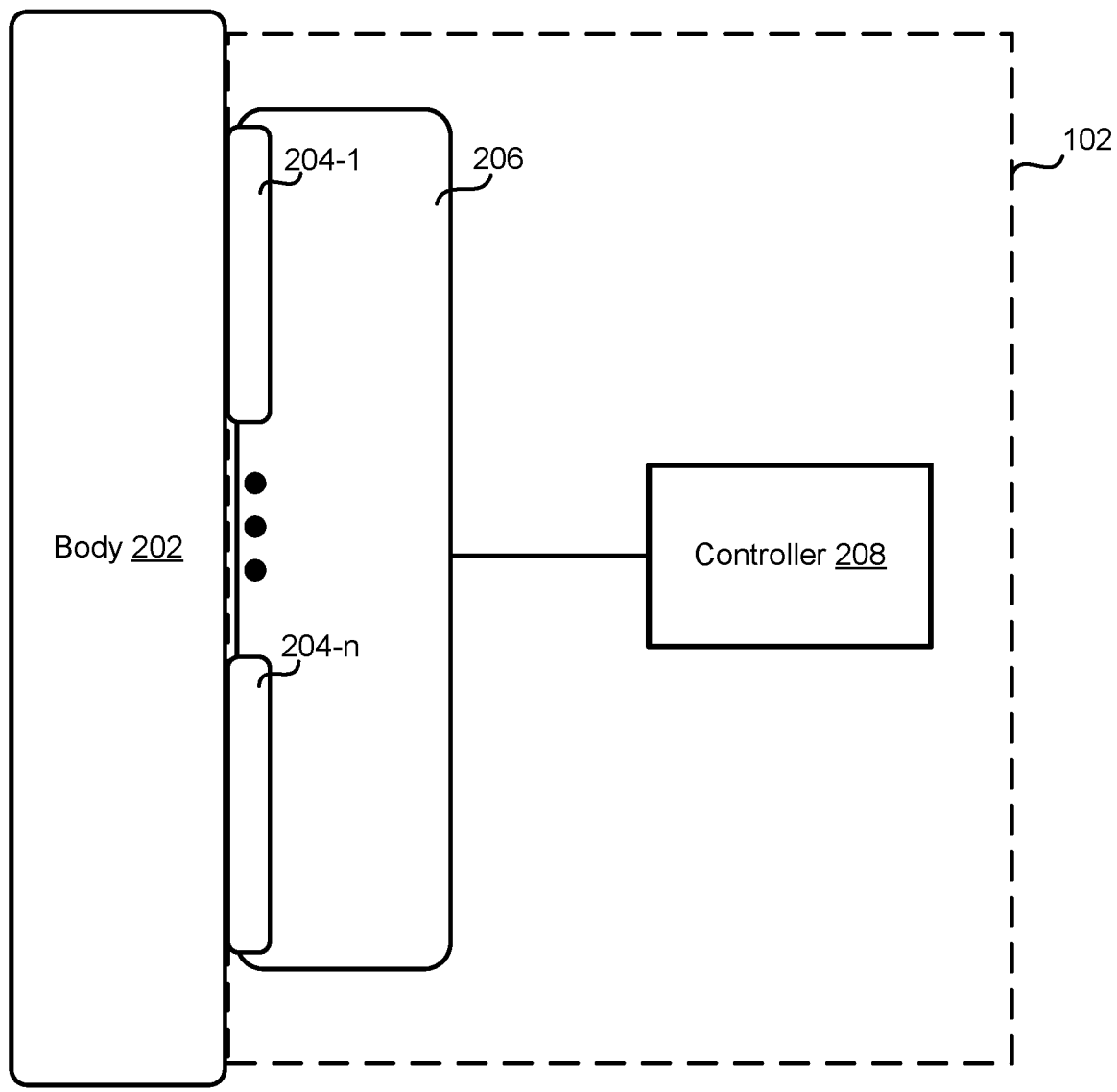
FIG. 2 illustrates example components of a wearable device in accordance with some embodiments.

FIG. 2 illustrates example components of the wearable device 102 in accordance with some embodiments. The wearable device 102 in FIG. 2 includes a plurality of electrodes 204 (e.g., electrode 204-1 through electrode 204-n), circuitry 206, and a controller 208. The electrodes 204 in FIG. 2 are in contact with a body 202 of the user (e.g., in contact with skin or tissue of the user). In some embodiments, the electrodes 204 include neuromuscular-signal-sensing electrodes. In some embodiments, the electrodes 204 are dry electrodes. In some embodiments, the electrodes 204 include one or more reference electrodes (e.g., electrodes not used for sensing neuromuscular signals in the body 202). In some embodiments, the circuitry 206 includes an analog front end (AFE) coupled to the electrodes 204. In some embodiments, the circuitry 206 includes a current-compensation component (e.g., coupled to one or more reference electrodes). In some embodiments, the circuitry 206 is co-located with the electrodes 204 (e.g., both the electrodes 204 and the circuitry 206 are arranged in an electrode pill). In some embodiments, the circuitry 206 is electrically coupled to the controller 208 (e.g., via one or more wires and/or one or more flexible circuit boards). In some embodiments, the controller 208 is arranged in a capsule and/or watch body of the wearable device 102.

Figure 3A:
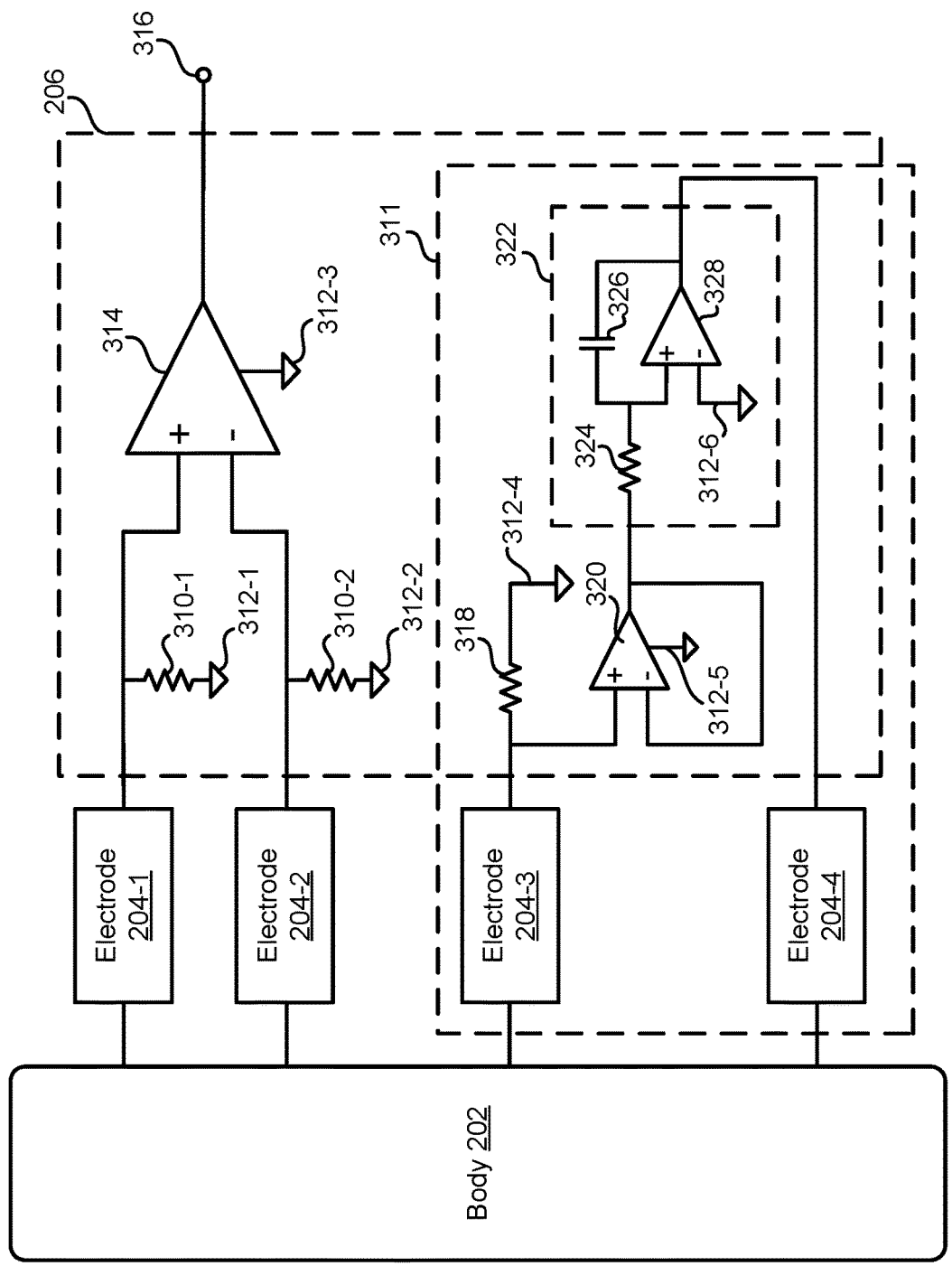
FIGS. 3A-3B illustrate example circuitry for a wearable device in accordance with some embodiments.
Figure 3B:
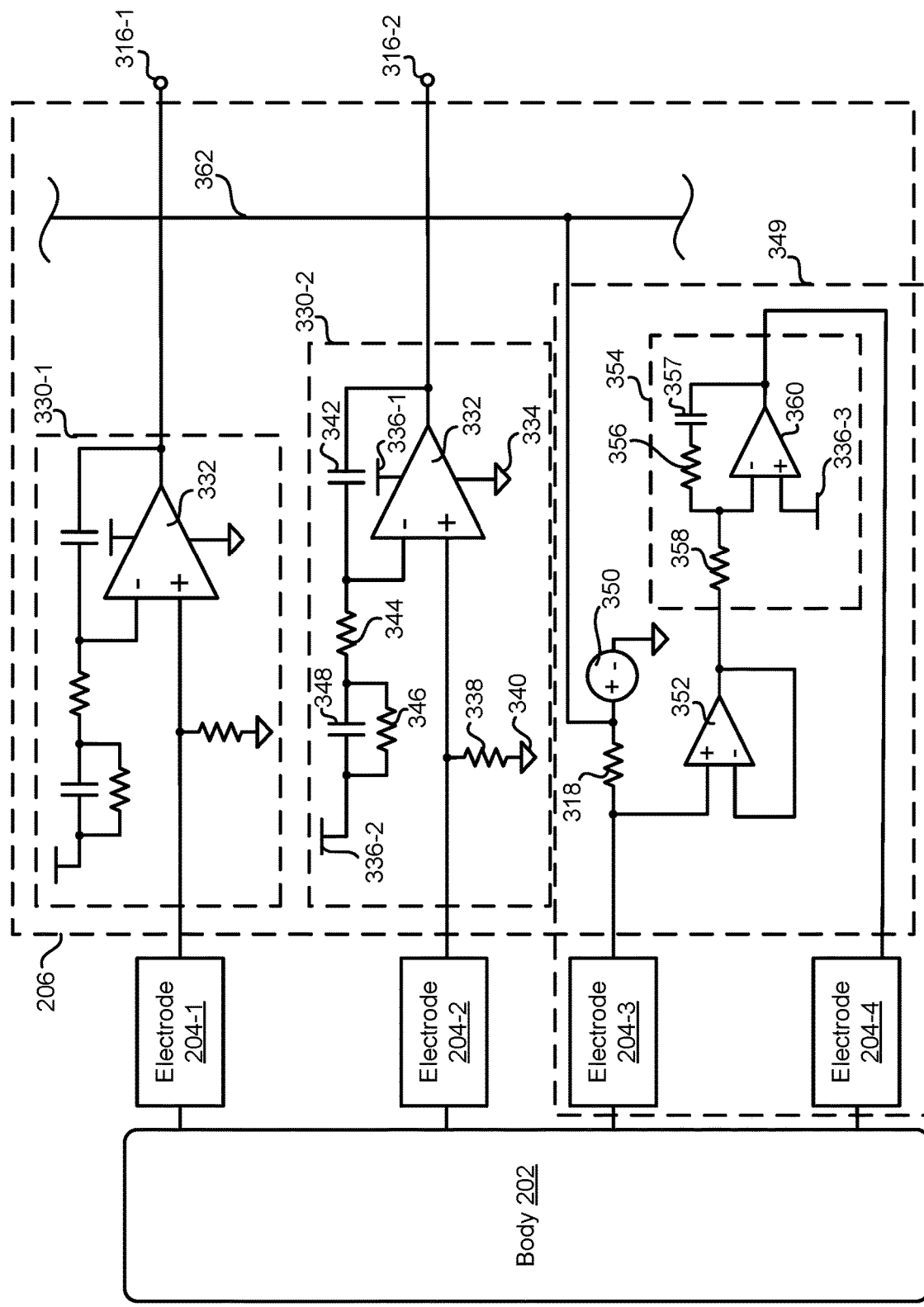

FIGS. 3A-3B illustrate example circuitry for a wearable device in accordance with some embodiments. FIG. 3A shows the electrodes 204-1, 204-2, 204-3, and 204-4 coupled to the body 202 of the user. FIG. 3A further shows components of the circuitry 206 and output 316 (e.g., an output for the controller 208). The circuitry 206 in FIG. 3A includes a differential amplifier 314 (e.g., an analog front end) coupled to the electrodes 204-1 and 204-2. In the example of FIG. 3A, the differential amplifier 314 is coupled to electrical ground 312-3 (e.g., a ground potential of the wearable device 102). The electrodes 204-1 and 204-2 in FIG. 3A are also coupled to electrical ground 312 (e.g., electrical ground 312-1 and 312-2 respectively) via resistors 310 (e.g., resistors 310-1 and 310-2 respectively). In some embodiments, the resistors 310 are high-impedance resistors (e.g., 100 megaohms, 1 giga-ohm, or more). The circuitry 206 in FIG. 3A further includes a resistor 318 (e.g., a current-sensing resistor) and electrical ground 312-4 coupled to the electrode 204-3 (e.g., a reference electrode). In some embodiments, the resistor 318 has a resistance in the range of 10 kiloohms to 500 kiloohms. In the circuit of FIG. 3A, a voltage difference of zero volts across the resistor 318 indicates that the ground potential of the device (e.g., the electrical grounds 312) is the same as the body potential of the user. The electrode 204-3 is also coupled to a buffer amplifier 320 and current-compensation component 322.

The buffer amplifier 320 in FIG. 3A is coupled to electrical ground 312-5. In some embodiments, the buffer amplifier 320 is replaced with a non-amplifying buffer component. In some embodiments, the buffer amplifier 320 is configured to prevent current flow from the current-compensation component 322 to the resistor 318 (e.g., the current from the current-compensation component 322 is instead directed through the electrode 204-4 to the body 202). The current-compensation component 322 in FIG. 3A includes a resistor 324, an amplifier 328, and a capacitor 326. The amplifier 328 is coupled to electrical ground 312-6. In some embodiments, the current-compensation component 322 is, or includes, an integral controller, a proportional-integral controller, or a proportional-integral-derivative (PID) controller. The current-compensation component 322 is coupled to the electrode 204-4 (e.g., a compensation electrode). The current-compensation component 322 is configured to move (and maintain) the voltage difference across the resistor 318 to zero volts. For example, the electrode 204-3 receives a current from the body 202 (e.g., a current $i_G$) and the current-compensation component 322 supplies an opposite current (e.g., a current $-i_G$) to the body 202 via the electrode 204-4 to cancel out $i_G$.

FIG. 3B shows the electrodes 204-1, 204-2, 204-3, and 204-4 coupled to the body 202 of the user. FIG. 3B further shows components of the circuitry 206 and outputs 316-1 and 316-2 (e.g., outputs for the controller 208). The circuitry 206 in FIG. 3B includes sensing components 330-1 and 330-2 (e.g., monopolar sensing components) coupled to the electrodes 204-1 and 204-2 respectively. The sensing component 330-2 includes a resistor 338 coupled to an electrical ground 340. The sensing component 330-2 also includes an amplifier 332 coupled to an electrical ground 334 (e.g., a same ground potential as the electrical ground 340). The amplifier 332 is further coupled to a voltage reference 336-1, a capacitor 342, a resistor 344, a resistor 346, a capacitor 348, and voltage reference 336-2. In some embodiments, the resistor 338 has a resistance in the range of 100 megaohms to 10 giga-ohms. In some embodiments, the capacitor 348 has a capacitance in the range of 100 microfarads to 1 millifarad. In some embodiments, the resistor 344 has a resistance in the range of 500 ohms to 5 kiloohms. In some embodiments, the capacitor 348 has a capacitance in the range of 1 microfarad to 50 microfarads. In some embodiments, the resistor 346 has a resistance in the range of 500 kiloohms to 5 megaohms. The electrodes 204-3 and 204-4 and associated current sensing and compensation components denoted by dotted-line box 311 in FIG. 3A can collectively be referred to as a ground tracking circuit.

The circuitry 206 in FIG. 3B further includes the resistor 318 and a buffer amplifier 352 coupled to the electrode 204-3. The resistor 318 is further coupled to a voltage source 350 and a shielding component 362. In some embodiments, the shielding component 362 is arranged and configured to reduce electromagnetic interference (EMI) with other components of the circuitry 206. The buffer amplifier 352 is coupled to a current-compensation component 354. The current-compensation component 354 includes a resistor 358 coupled to an amplifier 360 and a resistor 356. The resistor 356 is coupled to a capacitor 357. The amplifier 360 is further coupled to the reference voltage 336-3. In some embodiments, the reference voltages 336 are the same voltage as the voltage source 350. In some embodiments, the current-compensation component 354 is, or includes, an integral controller, a proportional-integral controller, or a proportional-integral-derivative (PID) controller. The output of the current-compensation component 354 is coupled to the electrode 204-4. The current-compensation component 354 is configured to move (and maintain) the voltage difference across the resistor 318 to zero volts. For example, the electrode 204-3 receives a current from the body 202 (e.g., a current $i_G$) and the current-compensation component 354 supplies an opposite current (e.g., a current $-i_G$) to the body 202 via the electrode 204-4 to cancel out $i_G$. The electrodes 204-3 and 204-4 and associated current sensing and compensation components denoted by a dotted-line box 349 in FIG. 3B can collectively be referred to as a ground tracking circuit.

Figure 4:
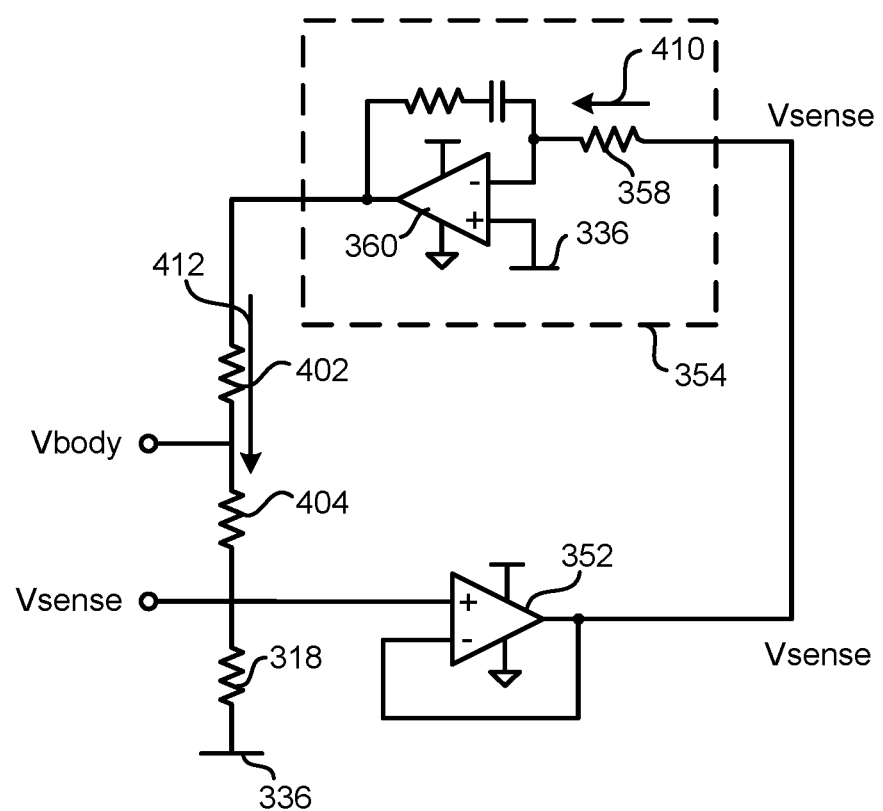
FIG. 4 illustrates example operation of the circuitry of FIG. 3B in accordance with some embodiments.

FIG. 4 illustrates example operation of the circuitry of FIG. 3B in accordance with some embodiments. FIG. 4 shows a voltage, Vsense, at a node between a resistor 404 (representing the electrode 204-3) and the resistor 318. Vsense corresponds to a difference between Vbody (e.g., a body potential of the user 101) and the reference voltage 336 (corresponding to the voltage source 350). Vsense is the voltage at an input and output of the buffer amplifier 352. FIG. 4 further shows a current 410 flowing across the resistor 358 (e.g., corresponding to a difference between Vsense and the reference voltage 336). In FIG. 4, the electrode 204-4 is represented by a resistor 402. The current-compensation component 354 generates a current 412 (e.g., a current $i_{comp}$) that compensates for the difference between Vsense and the reference voltage 336.

In accordance with some embodiments, FIG. 3B illustrates a system with two biosignal-sensing channels (e.g., the outputs 316-1 and 316-2) and a ground tracking circuit connected through the electrodes 204-3 and 204-4 (e.g., the buffer amplifier 352 and the current-compensation component 354). In the example of FIG. 3B, the two channels are arranged in a monopolar sensing configuration and measure the voltage between the corresponding electrode and the reference voltage 336. In accordance with some embodiments, the reference voltage 336 can be made stable with respect to both the circuit ground and the body voltage using the ground tracking circuit. Without the ground tracking circuit, noise couples into the system through the reference voltage 336. A stable reference voltage provides many advantages, including creating a reference that has improved robustness to electrode contact loss. The ground tracking circuits described herein, and corresponding principles, can be applied to other sensing architectures, including pseudo-monopolar sensing and differential sensing.

The ground tracking circuits described herein operate to eliminate currents that are generated from non-ideal sources, including external interference sources. Some of the ground tracking circuits described herein operate to eliminate currents by sensing the currents and canceling them, thus reducing the voltage drop between circuit ground and the body voltage. The ground tracking reduces and/or eliminates interference through two coupling paths (through-circuit ground and through-body).

An example ground tracking circuit includes a current-sensing component and a current-compensation component. The current-sensing component converts any current flowing through a reference electrode (e.g., the electrode 204-3) into a voltage (e.g., using the resistor 318). Under ideal conditions, the current that flows through the reference electrode is zero (e.g., the wearable device 102 is a battery-powered system with only high impedance connections to the body). In non-ideal conditions, there may be parasitic currents from interference sources as well as bias currents from the AFE (e.g., sensing components 330-1 and 330-2) that flow through the reference electrode. These parasitic and/or bias currents are reduced and/or eliminated through compensation.

The voltage generated across the resistor 318 is buffered and/or amplified and then fed into the current-compensation component 354. In accordance with some embodiments, the buffer/amplifier provides only one path for the current from the current-compensation component 354 to flow through the electrode 204-4. The current-compensation component 354 operates to keep the voltage across the resistor 318 at zero (e.g., current flow through the electrode 204-4 plus current flow through the electrode 204-3 is equal to zero). Net-zero current through the reference electrode and the resistor 318 effectively reduces the impedance between the circuit ground and the body 202, which improves the ground tracking and mitigates the impact of external interference on the sensing system. This mitigates the impact of two interference coupling paths, through-circuit ground and through-body pick-up.

Interference that couples directly into the high-impedance nodes at the inputs to the AFE can be mitigated through shielding coverage (e.g., via the shielding component 362). The shielding component 362 in FIG. 3B is connected directly to the voltage source 350. In circuits without ground tracking, a shield connected to the circuit generally performs worse than a shield that's galvanically isolated and connected directly to the body. When the shield is connected to the circuit, it increases the effective surface area of the circuit, which increases the parasitic capacitance to external interferers, resulting in more parasitic currents flowing through the reference electrode. The parasitic currents cause the circuit ground and body ground to deviate more from each other, degrading ground tracking performance and allowing interference to propagate through the system. The ground tracking circuits described herein cancel the parasitic currents, resulting in zero net current flow through the reference electrode. Coupling the shielding component to the reference electrode as shown in FIG. 3B also allows a shield electrode (e.g., the electrode 204-4) to be repurposed into a compensating electrode, e.g., reducing the total number of electrodes.

In some embodiments, the output of the current-compensation component is measured by a controller (e.g., the controller 208) and used as an indicator of environmental interference. For example, high-output voltage from the current-compensation component is an indicator of high (non-ideal) current flow through the reference electrode. In some embodiments, the frequency information is used to predict the source of interference. In some embodiments, the frequency information and/or the predicted source of interference is presented to the user. In some embodiments, the output of the current-compensation component is used as a measure of interference strength.

Figure 5A:
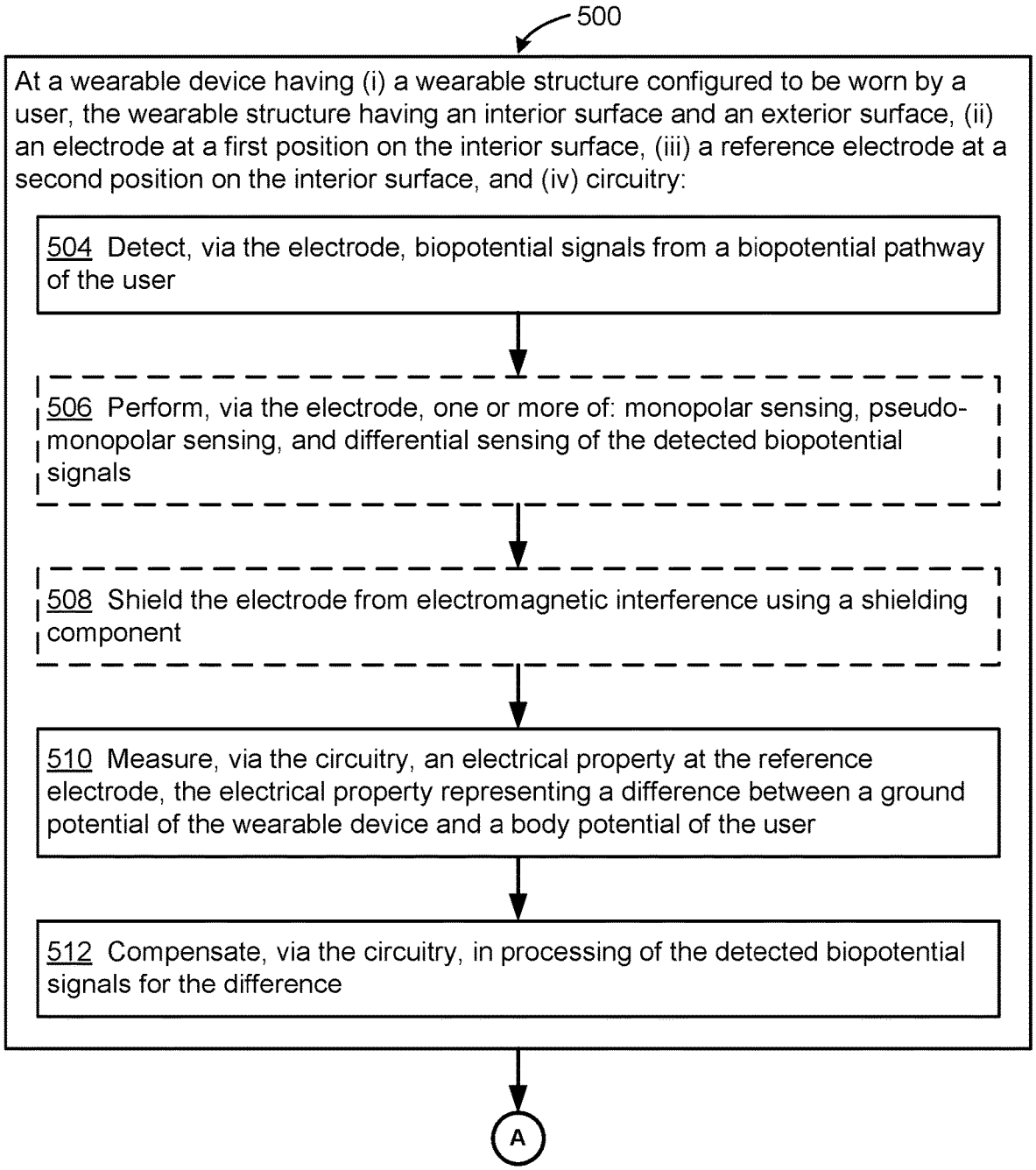

FIGS. 5A-5B are flow diagrams illustrating a method 500 for ground tracking in accordance with some embodiments. The method is performed at a wearable device (e.g., the wearable device 102) having (i) a wearable structure configured to be worn by a user (e.g., a wristband or watchband), the wearable structure having an interior surface and an exterior surface, (ii) an electrode (e.g., the electrode 204-1) at a first position on the interior surface, (iii) a reference electrode (e.g., the electrode 204-3) at a second position on the interior surface, and (iv) circuitry (e.g., the circuitry 206). In some embodiments, the electrode and the reference electrode are neuromuscular-signal sensors (e.g., EMG sensors).

The wearable device detects (504), via the electrode, biopotential signals from a biopotential pathway of the user. For example, the electrode 204-1 is positioned to detect biopotential signals from the body 202 in FIG. 2. In some embodiments, the biopotential signals are neuromuscular signals.

In some embodiments, the wearable device performs (506), via the electrode, one or more of monopolar sensing, pseudo-monopolar sensing, and differential sensing of the detected biopotential signals. For example, in FIG. 3A the electrodes 204-1 and 204-2 are coupled to differential amplifier 314 for differential sensing. As another example, in FIG. 3B the electrode 204-1 is arranged with amplifier 332 for monopolar sensing.

In some embodiments, the wearable device shields (508) the electrode from EMI using a shielding component (e.g., the shielding component 362). In some embodiments, the shielding component is electrically coupled to the reference electrode. In some embodiments, the shielding component is electrically connected to the reference electrode.

The wearable device measures (510), via the circuitry, an electrical property at the reference electrode, the electrical property representing a difference between a ground potential of the wearable device and a body potential of the user. In some embodiments, the electrical property is an electrical current or an electrical voltage. In some embodiments, the circuitry comprises a current-sensing component (e.g., the resistor 318) and a current-compensation component (e.g., the current-compensation component 354).

The wearable device compensates (512), via the circuitry, in processing of the detected biopotential signals for the difference. For example, the circuitry compensates for the difference in a reference voltage (e.g., the reference voltage 336) used in the biopotential sensing circuitry. In some embodiments, the circuitry compensates for the difference by providing a compensation current to the body of the user (e.g., the user 101) via a compensation electrode (e.g., the electrode 204-4).

In some embodiments, the wearable device detects (514), via an additional electrode (e.g., the electrode 204-2), additional biopotential signals from another biopotential pathway of the user and compensates for the difference in processing of the additional biopotential signals using the circuitry. For example, the circuits shown in FIGS. 3A and 3B compensate for the difference in the biosignal processing of both the electrode 204-1 and 204-2.

In some embodiments, the wearable device provides (516) a compensation current (e.g., the current 412) from the circuitry to the user via a compensation electrode (e.g., the electrode 204-4).

In some embodiments, the wearable device identifies (518) environmental interference based on a value of the difference. For example, the device identifies a source of interference based on an analysis of frequencies and/or amplitudes in the interference currents.

In some embodiments, the wearable device notifies (520) the user of the identified environmental interference. For example, the device displays a notification at a display of the device (e.g., the display 104). As another example, the device provides an audio and/or tactile notification to the user.

In some embodiments, the wearable device is a component of an AR system.

Example Systems

Figure 6B:
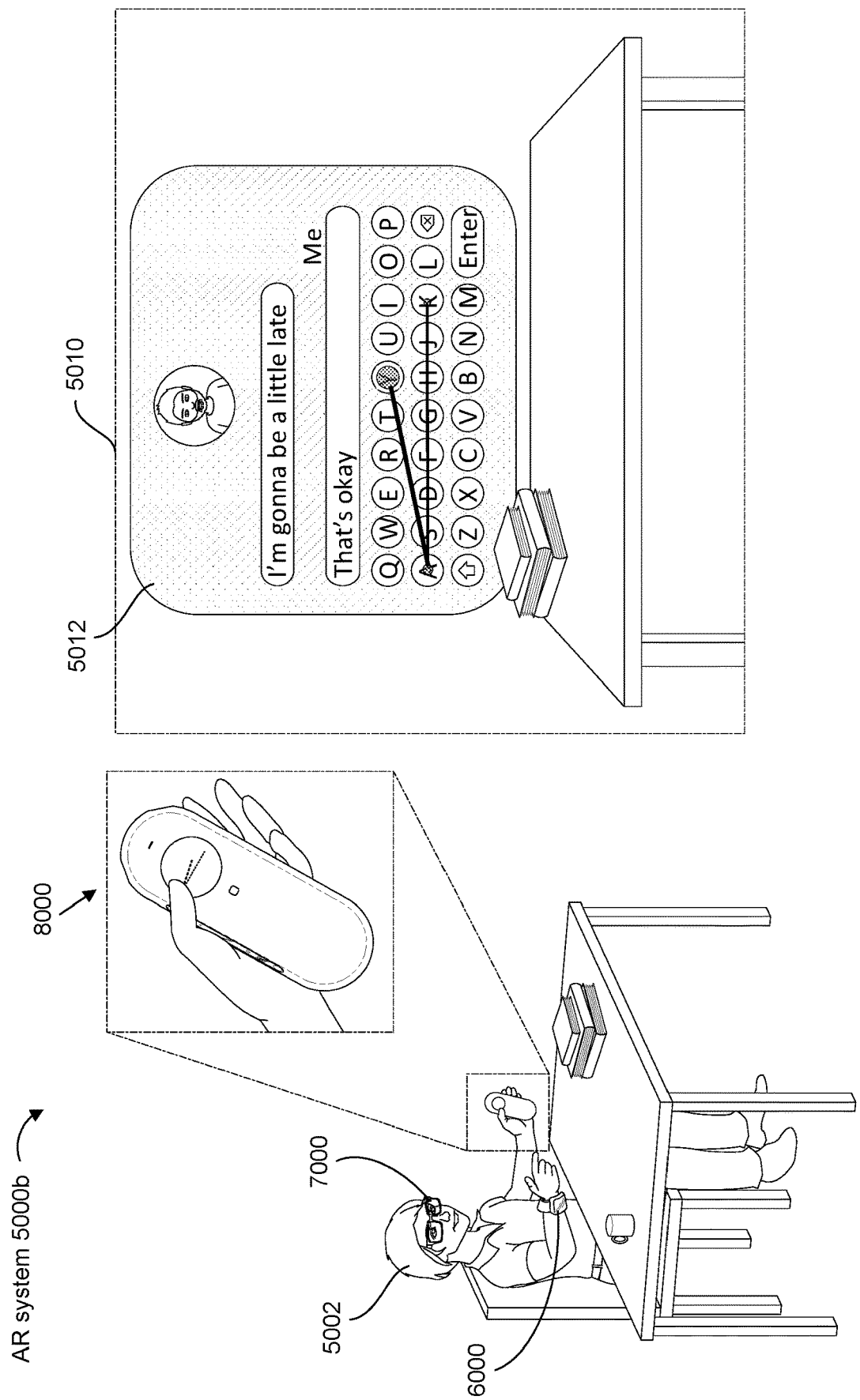
Figures 1, 6C:
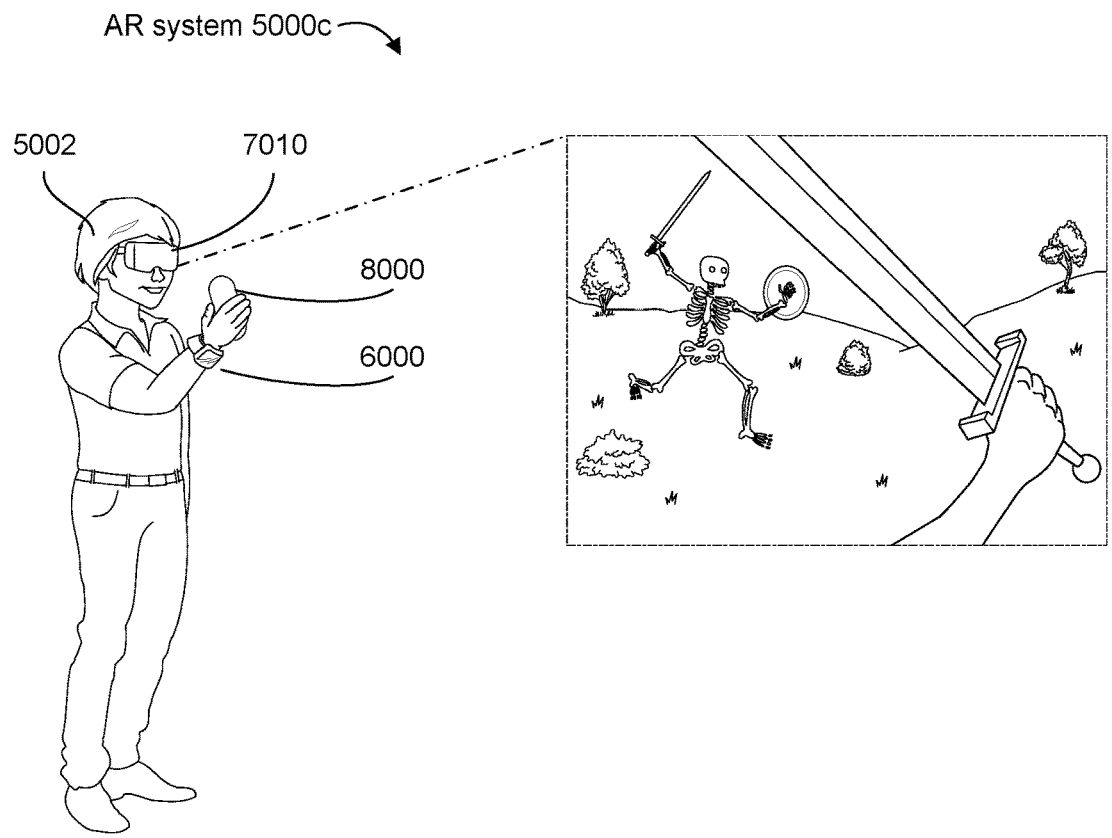
Figures 2, 6C:
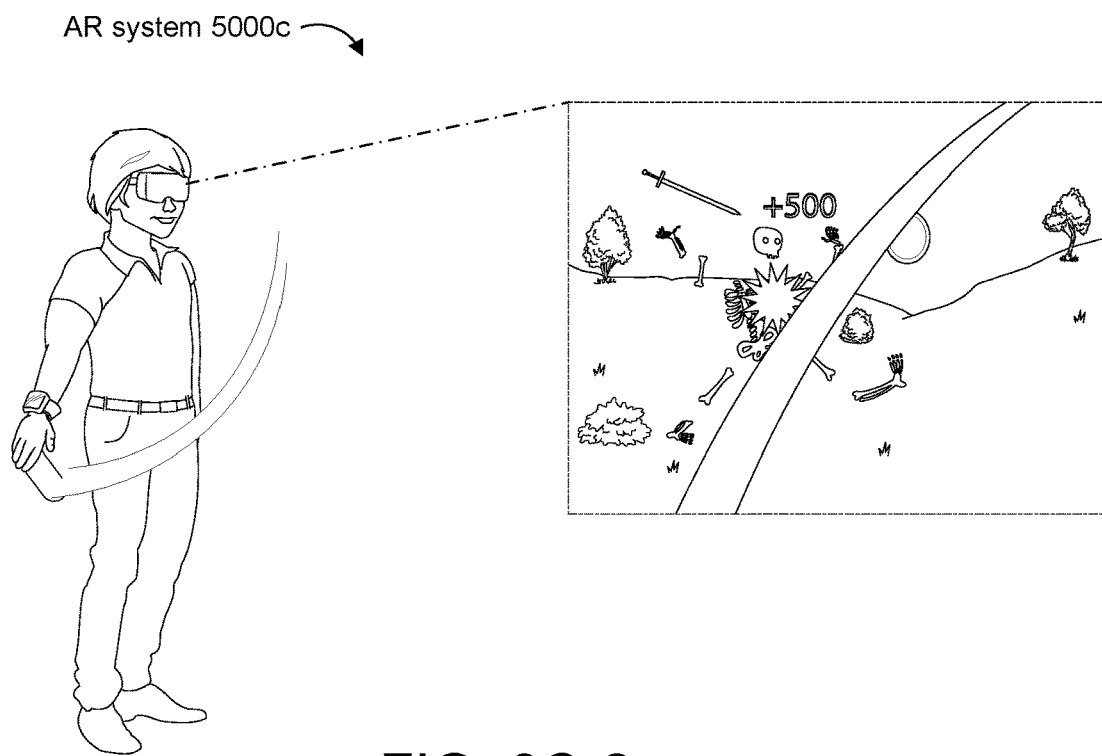
Figures 1, 6D:
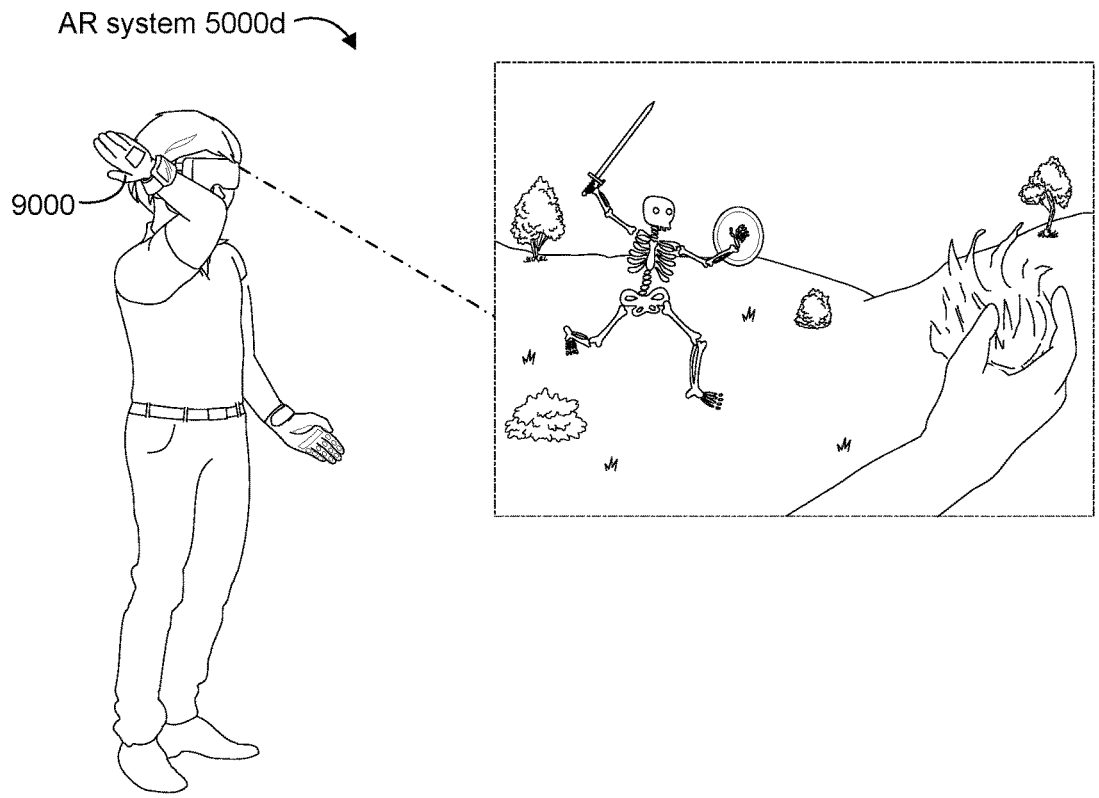
Figures 2, 6D:
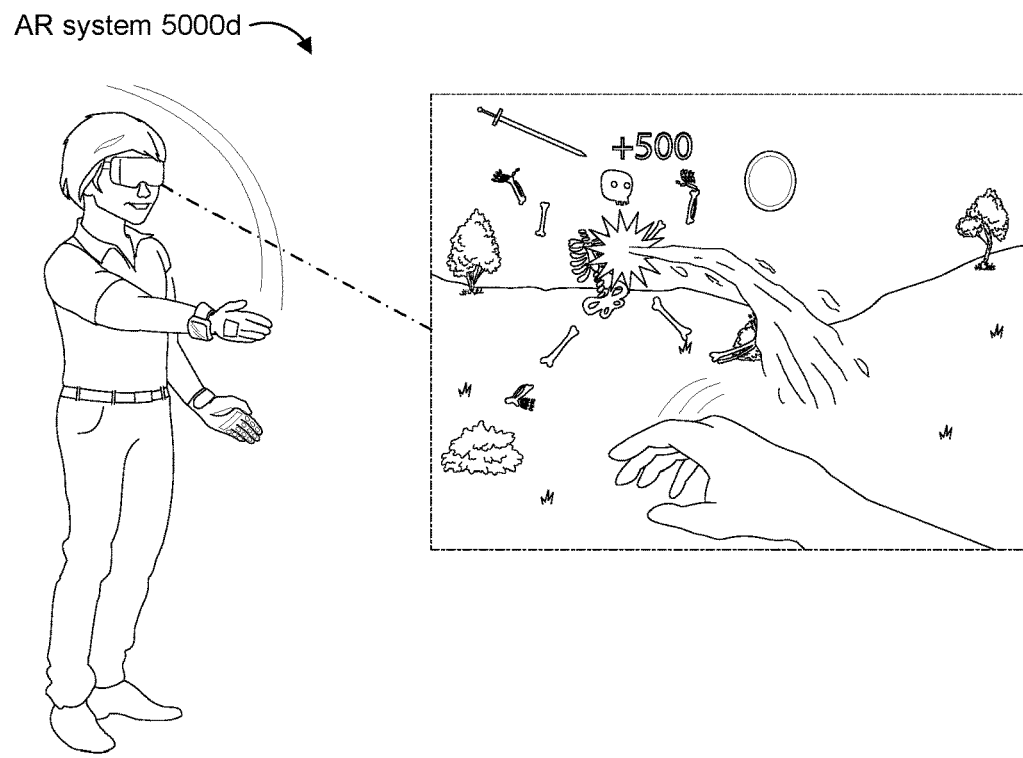

FIGS. 6A-6D illustrate example AR systems in accordance with some embodiments. FIG. 6A shows an AR system 5000a and first example user interactions using a wrist-wearable device 6000, a head-wearable device (e.g., AR system 7000), and/or a handheld intermediary processing device (HIPD) 8000. FIG. 6B shows an AR system 5000b and second example user interactions using the wrist-wearable device 6000, the AR system 7000, and/or an HIPD 8000. FIGS. 6C-1 and 6C-2 show an AR system 5000c and third example user interactions using a wrist-wearable device 6000, a head-wearable device (e.g., VR headset 7010), and/or an HIPD 8000. FIGS. 6D-1 and 6D-2 show a fourth AR system 5000d and fourth example user interactions using a wrist-wearable device 6000, VR headset 7010, and/or device 9000 (e.g., wearable haptic gloves). The above-example AR systems (described in detail below) can perform the various functions and/or operations described above with reference to FIGS. 1A-5B.

The wrist-wearable device 6000 and its components are described below in reference to FIGS. 7A-7B; the head-wearable devices and their components are described below in reference to FIGS. 8A-8D; and the HIPD 8000 and its components are described below in reference to FIGS. 9A-9B. Wearable gloves and their components are described below in reference to FIGS. 10A-10C. As shown in FIG. 6A, the wrist-wearable device 6000, the head-wearable devices, and/or the HIPD 8000 can communicatively couple via a network 5025 (e.g., cellular, near field, Wi-Fi, personal area network, or wireless LAN). Additionally, the wrist-wearable device 6000, the head-wearable devices, and/or the HIPD 8000 can also communicatively couple with one or more servers 5030, computers 5040 (e.g., laptops or desktop computers), mobile devices 5050 (e.g., smartphones or tablets), and/or other electronic devices via the network 5025 (e.g., cellular, near field, Wi-Fi, personal area network, or wireless LAN) Similarly, the device 9000 can also communicatively couple with the wrist-wearable device 6000, the head-wearable devices, the HIPD 8000, the one or more servers 5030, the computers 5040, the mobile devices 5050, and/or other electronic devices via the network 5025.

Turning to FIG. 6A, a user 5002 is shown wearing the wrist-wearable device 6000 and the AR system 7000 and having the HIPD 8000 on their desk. The wrist-wearable device 6000, the AR system 7000, and the HIPD 8000 facilitate user interaction with an AR environment. In particular, as shown by the AR system 5000a, the wrist-wearable device 6000, the AR system 7000, and/or the HIPD 8000 cause presentation of one or more avatars 5004, digital representations of contacts 5006, and virtual objects 5008. As discussed below, the user 5002 can interact with the one or more avatars 5004, digital representations of the contacts 5006, and virtual objects 5008 via the wrist-wearable device 6000, the AR system 7000, and/or the HIPD 8000.

The user 5002 can use any of the wrist-wearable device 6000, the AR system 7000, and/or the HIPD 8000 to provide user inputs. For example, the user 5002 can perform one or more hand gestures that are detected by the wrist-wearable device 6000 (e.g., using one or more EMG sensors and/or IMUs, described below in reference to FIGS. 7A-7B) and/or AR system 7000 (e.g., using one or more image sensor or camera, described below in reference to FIGS. 8A-8B) to provide a user input. Alternatively, or additionally, the user 5002 can provide a user input via one or more touch surfaces of the wrist-wearable device 6000, the AR system 7000, and/or the HIPD 8000, and/or voice commands captured by a microphone of the wrist-wearable device 6000, the AR system 7000, and/or the HIPD 8000. In some embodiments, the wrist-wearable device 6000, the AR system 7000, and/or the HIPD 8000 include a digital assistant to help the user in providing a user input (e.g., completing a sequence of operations, suggesting different operations or commands, providing reminders, or confirming a command). In some embodiments, the user 5002 provides a user input via one or more facial gestures and/or facial expressions. For example, cameras of the wrist-wearable device 6000, the AR system 7000, and/or the HIPD 8000 can track the user 5002's eyes for navigating a user interface.

The wrist-wearable device 6000, the AR system 7000, and/or the HIPD 8000 can operate alone or in conjunction to allow the user 5002 to interact with the AR environment. In some embodiments, the HIPD 8000 is configured to operate as a central hub or control center for the wrist-wearable device 6000, the AR system 7000, and/or another communicatively coupled device. For example, the user 5002 can provide an input to interact with the AR environment at any of the wrist-wearable device 6000, the AR system 7000, and/or the HIPD 8000, and the HIPD 8000 can identify one or more back-end and front-end tasks to cause the performance of the requested interaction and distribute instructions to cause the performance of the one or more back-end and front-end tasks at the wrist-wearable device 6000, the AR system 7000, and/or the HIPD 8000. In some embodiments, a back-end task is background processing task that is not perceptible by the user (e.g., rendering content, decompression, or compression), and a front-end task is a user-facing task that is perceptible to the user (e.g., presenting information to the user or providing feedback to the user). As described below in reference to FIGS. 9A-9B, the HIPD 8000 can perform the back-end tasks and provide the wrist-wearable device 6000 and/or the AR system 7000 operational data corresponding to the performed back-end tasks such that the wrist-wearable device 6000 and/or the AR system 7000 can perform the front-end tasks. In this way, the HIPD 8000, which can have more computational resources and greater thermal headroom than the wrist-wearable device 6000 and/or the AR system 7000, performs computationally intensive tasks and reduces the computer resource utilization and/or power usage of the wrist-wearable device 6000 and/or the AR system 7000.

In the example shown by the AR system 5000a, the HIPD 8000 identifies one or more back-end tasks and front-end tasks associated with a user request to initiate an AR video call with one or more other users (represented by the avatar 5004 and the digital representation of the contact 5006) and distributes instructions to cause the performance of the one or more back-end tasks and front-end tasks. In particular, the HIPD 8000 performs back-end tasks for processing and/or rendering image data (and other data) associated with the AR video call and provides operational data associated with the performed back-end tasks to the AR system 7000 such that the AR system 7000 perform front-end tasks for presenting the AR video call (e.g., presenting the avatar 5004 and the digital representation of the contact 5006).

In some embodiments, the HIPD 8000 operates as a focal or anchor point for causing the presentation of information. This allows the user 5002 to be generally aware of where information is presented. For example, as shown in the AR system 5000a, the avatar 5004 and the digital representation of the contact 5006 are presented above the HIPD 8000. In particular, the HIPD 8000 and the AR system 7000 operate in conjunction to determine a location for presenting the avatar 5004 and the digital representation of the contact 5006. In some embodiments, information can be presented a predetermined distance from the HIPD 8000 (e.g., within 5 meters). For example, as shown in the AR system 5000a, virtual object 5008 is presented on the desk some distance from the HIPD 8000. Similar to the above example, the HIPD 8000 and the AR system 7000 can operate in conjunction to determine a location for presenting the virtual object 5008. Alternatively, in some embodiments, presentation of information is not bound by the HIPD 8000. More specifically, the avatar 5004, the digital representation of the contact 5006, and the virtual object 5008 do not have to be presented within a predetermined distance of the HIPD 8000.

User inputs provided at the wrist-wearable device 6000, the AR system 7000, and/or the HIPD 8000 are coordinated such that the user can use any device to initiate, continue, and/or complete an operation. For example, the user 5002 can provide a user input to the AR system 7000 to cause the AR system 7000 to present the virtual object 5008 and, while the virtual object 5008 is presented by the AR system 7000, the user 5002 can provide one or more hand gestures via the wrist-wearable device 6000 to interact and/or manipulate the virtual object 5008.

FIG. 6B shows the user 5002 wearing the wrist-wearable device 6000 and the AR system 7000 and holding the HIPD 8000. In the AR system 5000b, the wrist-wearable device 6000, the AR system 7000, and/or the HIPD 8000 are used to receive and/or provide one or more messages to a contact of the user 5002. In particular, the wrist-wearable device 6000, the AR system 7000, and/or the HIPD 8000 detect and coordinate one or more user inputs to initiate a messaging application and prepare a response to a received message via the messaging application.

In some embodiments, the user 5002 initiates, via a user input, an application on the wrist-wearable device 6000, the AR system 7000, and/or the HIPD 8000 that causes the application to initiate on at least one device. For example, in the AR system 5000b the user 5002 performs a hand gesture associated with a command for initiating a messaging application (represented by messaging user interface 5012); the wrist-wearable device 6000 detects the hand gesture; and, based on a determination that the user 5002 is wearing AR system 7000, causes the AR system 7000 to present a messaging user interface 5012 of the messaging application. The AR system 7000 can present the messaging user interface 5012 to the user 5002 via its display (e.g., as shown by user 5002's field of view 5010). In some embodiments, the application is initiated and ran on the device (e.g., the wrist-wearable device 6000, the AR system 7000, and/or the HIPD 8000) that detects the user input to initiate the application, and the device provides another device operational data to cause the presentation of the messaging application. For example, the wrist-wearable device 6000 can detect the user input to initiate a messaging application; initiate and run the messaging application; and provide operational data to the AR system 7000 and/or the HIPD 8000 to cause presentation of the messaging application. Alternatively, the application can be initiated and ran at a device other than the device that detected the user input. For example, the wrist-wearable device 6000 can detect the hand gesture associated with initiating the messaging application and cause the HIPD 8000 to run the messaging application and coordinate the presentation of the messaging application.

Further, the user 5002 can provide a user input provided at the wrist-wearable device 6000, the AR system 7000, and/or the HIPD 8000 to continue and/or complete an operation initiated are at another device. For example, after initiating the messaging application via the wrist-wearable device 6000 and while the AR system 7000 present the messaging user interface 5012, the user 5002 can provide an input at the HIPD 8000 to prepare a response (e.g., shown by the swipe gesture performed on the HIPD 8000). The user 5002's gestures performed on the HIPD 8000 can be provided and/or displayed on another device. For example, the user 5002's swipe gestured performed on the HIPD 8000 are displayed on a virtual keyboard of the messaging user interface 5012 displayed by the AR system 7000.

In some embodiments, the wrist-wearable device 6000, the AR system 7000, the HIPD 8000, and/or other communicatively couple device presents one or more notifications to the user 5002. The notification can be an indication of a new message, an incoming call, an application update, or a status update. The user 5002 can select the notification via the wrist-wearable device 6000, the AR system 7000, the HIPD 8000, and cause presentation of an application or operation associated with the notification on at least one device. For example, the user 5002 can receive a notification that a message was received at the wrist-wearable device 6000, the AR system 7000, the HIPD 8000, and/or other communicatively couple device and provide a user input at the wrist-wearable device 6000, the AR system 7000, and/or the HIPD 8000 to review the notification, and the device detecting the user input can cause an application associated with the notification to be initiated and/or presented at the wrist-wearable device 6000, the AR system 7000, and/or the HIPD 8000.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, and financial applications. For example, the AR system 7000 can present to the user 5002 game application data and the HIPD 8000 can use a controller to provide inputs to the game. Similarly, the user 5002 can use the wrist-wearable device 6000 to initiate a camera of the AR system 7000, and the user can use the wrist-wearable device 6000, the AR system 7000, and/or the HIPD 8000 to manipulate the image capture (e.g., zoom in or out or apply filters) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform one or more functions. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

As described herein, a processor (e.g., a central processing unit (CPU)), is an electronic component that is responsible for executing instructions and controlling the operation of an electronic device (e.g., a computer). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, memory refers to electronic components in a computer or electronic device that store data and instructions for the processor to access and manipulate. Examples of memory can include: (i) random access memory (RAM) configured to store data and instructions temporarily; (ii) read-only memory (ROM) configured to store data and instructions permanently (e.g., one or more portions of system firmware, and/or boot loaders); (iii) flash memory, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, and/or JSON data). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) Bluetooth interfaces configured to allow devices to communicate with each other, including Bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) Wi-Fi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface); and light sensors (e.g., time-of-flight sensors, infrared light sensors, and/or visible light sensors). As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiography (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; messaging applications; media-streaming applications; financial applications; calendars; clocks; communication interface modules for enabling wired and/or wireless connections between different respective electronic devices (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocols);

As described herein, a communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs) and/or protocols like HTTP and TCP/IP).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified).

Example Wrist-Wearable Devices

Figure 7A:
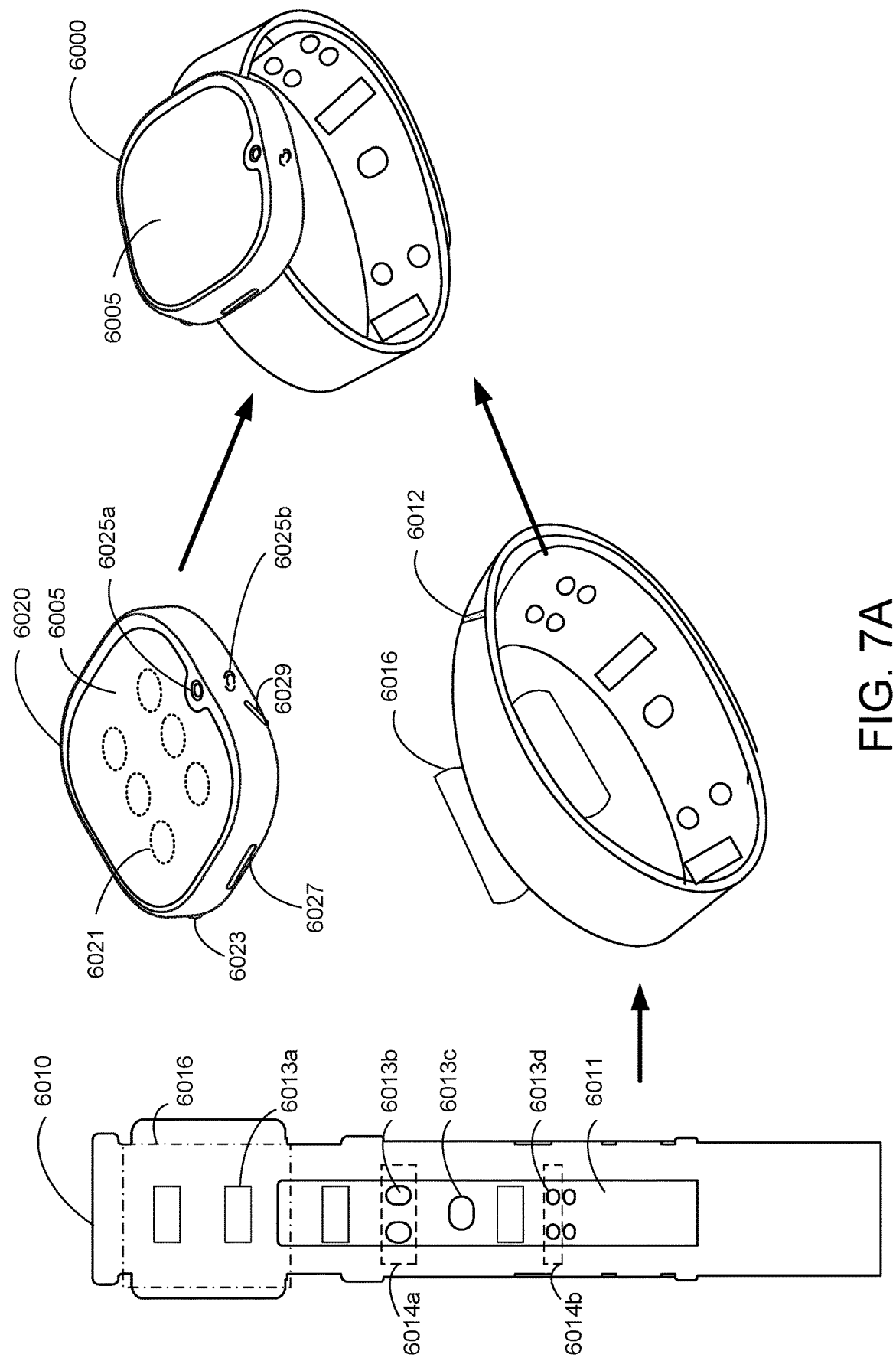
FIGS. 7A-7B illustrate an example wrist-wearable device in accordance with some embodiments.
Figure 7B:
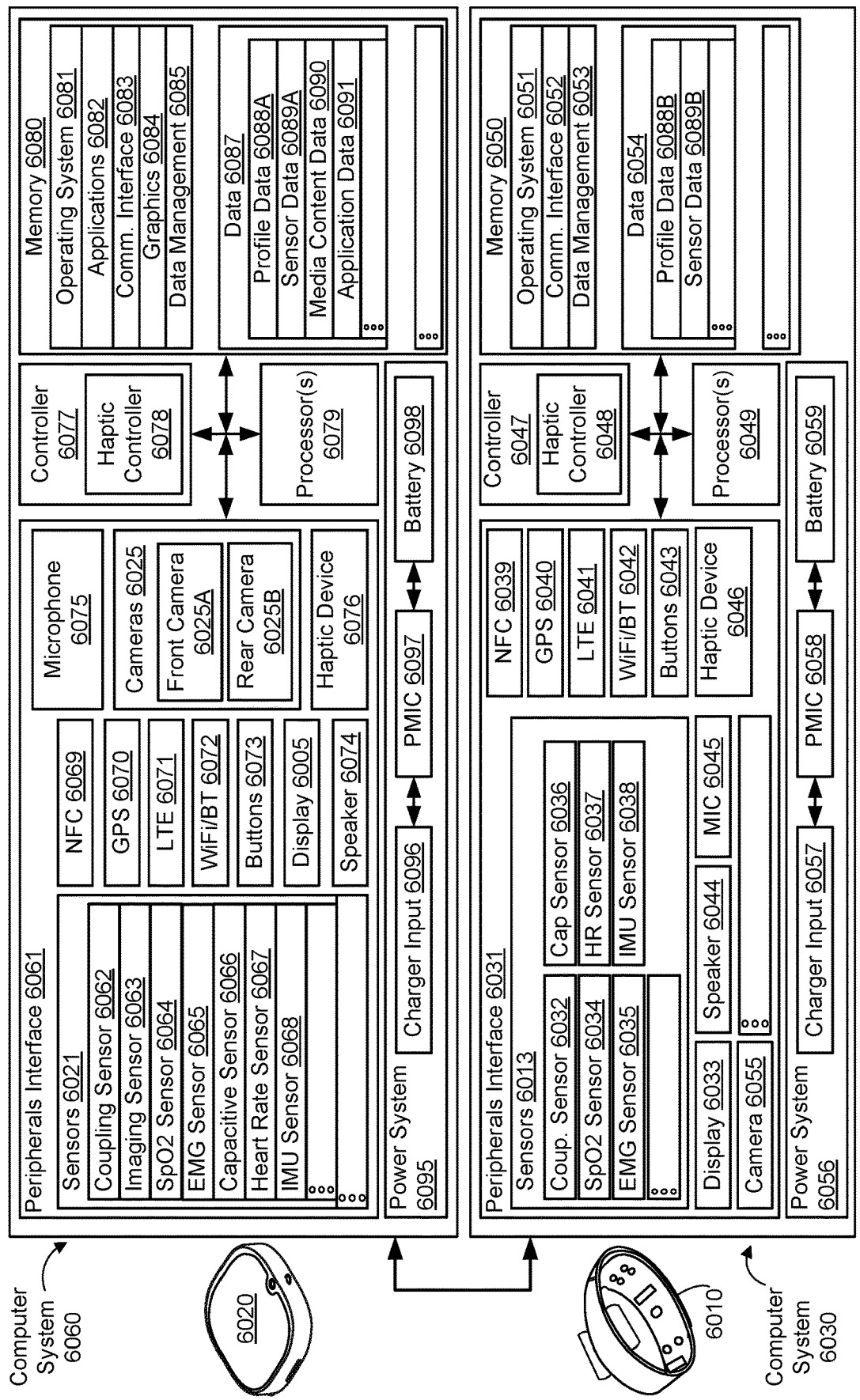

FIGS. 7A and 7B illustrate the wrist-wearable device 6000 in accordance with some embodiments. FIG. 7A illustrates components of the wrist-wearable device 6000, which can be used individually or in combination, including combinations that include other electronic devices and/or electronic components. In some embodiments, the wrist-wearable device 6000 is an implementation of the wearable device 102. For example, the wrist-wearable device 6000 may include the circuits and functionality described above with respect to the wearable device 102.

FIG. 7A shows a wearable band 6010 and a watch body 6020 (or capsule) being coupled, as discussed below, to form the wrist-wearable device 6000. The wrist-wearable device 6000 can perform various functions and/or operations associated with navigating through user interfaces and selectively opening applications, as well as the functions and/or operations described above with reference to FIGS. 1A-6D.

As will be described in more detail below, operations executed by the wrist-wearable device 6000 can include: (i) presenting content to a user (e.g., displaying visual content via a display 6005); (ii) detecting (e.g., sensing) user input (e.g., sensing a touch on peripheral button 6023 and/or at a touch screen of the display 6005, a hand gesture detected by sensors (e.g., biopotential sensors); (iii) sensing biometric data via one or more sensors 6013 (e.g., neuromuscular signals, heart rate, temperature, and/or sleep); messaging (e.g., text, speech, and/or video); image capture via one or more imaging devices or cameras 6025; wireless communications (e.g., cellular, near field, Wi-Fi, and/or personal area network); location determination; financial transactions; providing haptic feedback; alarms; notifications; biometric authentication; health monitoring; and sleep monitoring.

The above-example functions can be executed independently in the watch body 6020, independently in the wearable band 6010, and/or via an electronic communication between the watch body 6020 and the wearable band 6010. In some embodiments, functions can be executed on the wrist-wearable device 6000 while an AR environment is being presented (e.g., via one of the AR systems 5000a to 5000d). As the skilled artisan will appreciate upon reading the descriptions provided herein, the novel wearable devices described herein can be used with other types of AR environments.

The wearable band 6010 can be configured to be worn by a user such that an inner surface of the wearable band 6010 is in contact with the user's skin. When worn by a user, sensors 6013 contact the user's skin. The sensors 6013 can sense biometric data such as a user's heart rate, saturated oxygen level, temperature, sweat level, neuromuscular signal sensors, or a combination thereof. The sensors 6013 can also sense data about a user's environment including a user's motion, altitude, location, orientation, gait, acceleration, position, or a combination thereof. In some embodiment, the sensors 6013 are configured to track a position and/or motion of the wearable band 6010. The one or more sensors 6013 can include any of the sensors defined above and/or discussed below with respect to FIG. 7B.

The one or more sensors 6013 can be distributed on an inside and/or an outside surface of the wearable band 6010. In some embodiments, the one or more sensors 6013 are uniformly spaced along the wearable band 6010. Alternatively, in some embodiments, the one or more sensors 6013 are positioned at distinct points along the wearable band 6010. As shown in FIG. 7A, the one or more sensors 6013 can be the same or distinct. For example, in some embodiments, the one or more sensors 6013 can be shaped as a pill (e.g., sensor 6013a), an oval, a circle a square, an oblong (e.g., sensor 6013c) and/or any other shape that maintains contact with the user's skin (e.g., such that neuromuscular signal and/or other biometric data can be accurately measured at the user's skin). In some embodiments, the one or more sensors 6013 are aligned to form pairs of sensors (e.g., for sensing neuromuscular signals based on differential sensing within each respective sensor). For example, sensor 6013b is aligned with an adjacent sensor to form sensor pair 6014a and sensor 6013d aligned with an adjacent sensor to form sensor pair 6014b. In some embodiments, the wearable band 6010 does not have a sensor pair. Alternatively, in some embodiments, the wearable band 6010 has a predetermined number of sensor pairs (e.g., one pair of sensors, three pairs of sensors, four pairs of sensors, six pairs of sensors, or sixteen pairs of sensors).

The wearable band 6010 can include any suitable number of sensors 6013. In some embodiments, the number and arrangement of sensors 6013 depends on the particular application for which the wearable band 6010 is used. For instance, a wearable band 6010 configured as an armband, wristband, or chest-band may include a plurality of sensors 6013 with different number of sensors 6013 and different arrangement for each use case, such as medical use cases as compared to gaming or general day-to-day use cases.

In accordance with some embodiments, the wearable band 6010 further includes an electrical ground electrode and a shielding electrode. The electrical ground and shielding electrodes, like the sensors 6013, can be distributed on the inside surface of the wearable band 6010 such that they contact a portion of the user's skin. For example, the electrical ground and shielding electrodes can be at an inside surface of coupling mechanism 6016 or an inside surface of a wearable structure 6011. The electrical ground and shielding electrodes can be formed and/or use the same components as the sensors 6013. In some embodiments, the wearable band 6010 includes more than one electrical ground electrode and more than one shielding electrode.

The sensors 6013 can be formed as part of the wearable structure 6011 of the wearable band 6010. In some embodiments, the sensors 6013 are flush or substantially flush with the wearable structure 6011 such that they do not extend beyond the surface of the wearable structure 6011. While flush with the wearable structure 6011, the sensors 6013 are still configured to contact the user's skin (e.g., via a skin-contacting surface). Alternatively, in some embodiments, the sensors 6013 extend beyond the wearable structure 6011 a predetermined distance (e.g., 0.1-2 mm) to make contact and depress into the user's skin. In some embodiment, the sensors 6013 are coupled to an actuator (not shown) configured to adjust an extension height (e.g., a distance from the surface of the wearable structure 6011) of the sensors 6013 such that the sensors 6013 make contact and depress into the user's skin. In some embodiments, the actuators adjust the extension height between 0.01 mm-1.2 mm. This allows the user to customize the positioning of the sensors 6013 to improve the overall comfort of the wearable band 6010 when worn while still allowing the sensors 6013 to contact the user's skin. In some embodiments, the sensors 6013 are indistinguishable from the wearable structure 6011 when worn by the user.

The wearable structure 6011 can be formed of an elastic material (e.g., an elastomer) configured to be stretched and fitted to be worn by the user. In some embodiments, the wearable structure 6011 is a textile or woven fabric. As described above, the sensors 6013 can be formed as part of a wearable structure 6011. For example, the sensors 6013 can be molded into the wearable structure 6011 or be integrated into a woven fabric (e.g., the sensors 6013 can be sewn into the fabric and mimic the pliability of fabric (e.g., the sensors 6013 can be constructed from a series woven strands of fabric)).

The wearable structure 6011 can include flexible electronic connectors that interconnect the sensors 6013, the electronic circuitry, and/or other electronic components (described below in reference to FIG. 7B) that are enclosed in the wearable band 6010. In some embodiments, the flexible electronic connectors are configured to interconnect the sensors 6013, the electronic circuitry, and/or other electronic components of the wearable band 6010 with respective sensors and/or other electronic components of another electronic device (e.g., watch body 6020). The flexible electronic connectors are configured to move with the wearable structure 6011 such that the user adjustment to the wearable structure 6011 (e.g., resizing, pulling, and/or folding) does not stress or strain the electrical coupling of components of the wearable band 6010.

As described above, the wearable band 6010 is configured to be worn by a user. In particular, the wearable band 6010 can be shaped or otherwise manipulated to be worn by a user. For example, the wearable band 6010 can be shaped to have a substantially circular shape such that it can be configured to be worn on the user's lower arm or wrist. Alternatively, the wearable band 6010 can be shaped to be worn on another body part of the user, such as the user's upper arm (e.g., around a bicep), forearm, chest, or legs. The wearable band 6010 can include a retaining mechanism 6012 (e.g., a buckle or a hook and loop fastener) for securing the wearable band 6010 to the user's wrist or other body part. While the wearable band 6010 is worn by the user, the sensors 6013 sense data (referred to as sensor data) from the user's skin. In particular, the sensors 6013 of the wearable band 6010 obtain (e.g., sense and record) neuromuscular signals.

The sensed data (e.g., sensed neuromuscular signals) can be used to detect and/or determine the user's intention to perform certain motor actions. In particular, the sensors 6013 sense and record neuromuscular signals from the user as the user performs muscular activations (e.g., movements and/or gestures). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 6005 of the wrist-wearable device 6000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 6013 can be used to provide a user with an enhanced interaction with a physical object (e.g., devices communicatively coupled with the wearable band 6010) and/or a virtual object in an artificial-reality application generated by an artificial-reality system (e.g., user interface objects presented on the display 6005, or another computing device (e.g., a smartphone)).

In some embodiments, the wearable band 6010 includes one or more haptic devices 6046 (FIG. 7B, e.g., a vibratory haptic actuator) that are configured to provide haptic feedback (e.g., a cutaneous and/or kinesthetic sensation) to the user's skin. The sensors 6013, and/or the haptic devices 6046 can be configured to operate in conjunction with multiple applications including, without limitation, health monitoring, social media, games, and artificial reality (e.g., the applications associated with artificial reality).

The wearable band 6010 can also include coupling mechanism 6016 (e.g., a cradle or a shape of the coupling mechanism can correspond to shape of the watch body 6020 of the wrist-wearable device 6000) for detachably coupling a capsule (e.g., a computing unit) or watch body 6020 (via a coupling surface of the watch body 6020) to the wearable band 6010. In particular, the coupling mechanism 6016 can be configured to receive a coupling surface proximate to the bottom side of the watch body 6020 (e.g., a side opposite to a front side of the watch body 6020 where the display 6005 is located), such that a user can push the watch body 6020 downward into the coupling mechanism 6016 to attach the watch body 6020 to the coupling mechanism 6016. In some embodiments, the coupling mechanism 6016 can be configured to receive a top side of the watch body 6020 (e.g., a side proximate to the front side of the watch body 6020 where the display 6005 is located) that is pushed upward into the cradle, as opposed to being pushed downward into the coupling mechanism 6016. In some embodiments, the coupling mechanism 6016 is an integrated component of the wearable band 6010 such that the wearable band 6010 and the coupling mechanism 6016 are a single unitary structure. In some embodiments, the coupling mechanism 6016 is a type of frame or shell that allows the watch body 6020 coupling surface to be retained within or on the wearable band 6010 coupling mechanism 6016 (e.g., a cradle, a tracker band, a support base, or a clasp).

The coupling mechanism 6016 can allow for the watch body 6020 to be detachably coupled to the wearable band 6010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 6020 to the wearable band 6010 and to decouple the watch body 6020 from the wearable band 6010. For example, a user can twist, slide, turn, push, pull, or rotate the watch body 6020 relative to the wearable band 6010, or a combination thereof, to attach the watch body 6020 to the wearable band 6010 and to detach the watch body 6020 from the wearable band 6010. Alternatively, as discussed below, in some embodiments, the watch body 6020 can be decoupled from the wearable band 6010 by actuation of the release mechanism 6029.

The wearable band 6010 can be coupled with a watch body 6020 to increase the functionality of the wearable band 6010 (e.g., converting the wearable band 6010 into a wrist-wearable device 6000, adding an additional computing unit and/or battery to increase computational resources and/or a battery life of the wearable band 6010, and/or adding additional sensors to improve sensed data). As described above, the wearable band 6010 (and the coupling mechanism 6016) is configured to operate independently (e.g., execute functions independently) from watch body 6020. For example, the coupling mechanism 6016 can include one or more sensors 6013 that contact a user's skin when the wearable band 6010 is worn by the user and provide sensor data for determining control commands.

A user can detach the watch body 6020 (or capsule) from the wearable band 6010 in order to reduce the encumbrance of the wrist-wearable device 6000 to the user. For embodiments in which the watch body 6020 is removable, the watch body 6020 can be referred to as a removable structure, such that in these embodiments the wrist-wearable device 6000 includes a wearable portion (e.g., the wearable band 6010) and a removable structure (the watch body 6020).

Turning to the watch body 6020, the watch body 6020 can have a substantially rectangular or circular shape. The watch body 6020 is configured to be worn by the user on their wrist or on another body part. More specifically, the watch body 6020 is sized to be easily carried by the user, attached on a portion of the user's clothing, and/or coupled to the wearable band 6010 (forming the wrist-wearable device 6000). As described above, the watch body 6020 can have a shape corresponding to the coupling mechanism 6016 of the wearable band 6010. In some embodiments, the watch body 6020 includes a single release mechanism 6029 or multiple release mechanisms (e.g., two release mechanisms 6029 positioned on opposing sides of the watch body 6020, such as spring-loaded buttons) for decoupling the watch body 6020 and the wearable band 6010. The release mechanism 6029 can include, without limitation, a button, a knob, a plunger, a handle, a lever, a fastener, a clasp, a dial, a latch, or a combination thereof.

A user can actuate the release mechanism 6029 by pushing, turning, lifting, depressing, shifting, or performing other actions on the release mechanism 6029. Actuation of the release mechanism 6029 can release (e.g., decouple) the watch body 6020 from the coupling mechanism 6016 of the wearable band 6010, allowing the user to use the watch body 6020 independently from wearable band 6010, and vice versa. For example, decoupling the watch body 6020 from the wearable band 6010 can allow the user to capture images using rear-facing camera 6025B. Although the is shown positioned at a corner of watch body 6020, the release mechanism 6029 can be positioned anywhere on watch body 6020 that is convenient for the user to actuate. In addition, in some embodiments, the wearable band 6010 can also include a respective release mechanism for decoupling the watch body 6020 from the coupling mechanism 6016. In some embodiments, the release mechanism 6029 is optional and the watch body 6020 can be decoupled from the coupling mechanism 6016 as described above (e.g., via twisting or rotating).

The watch body 6020 can include one or more peripheral buttons 6023 and 6027 for performing various operations at the watch body 6020. For example, the peripheral buttons 6023 and 6027 can be used to turn on or wake (e.g., transition from a sleep state to an active state) the display 6005, unlock the watch body 6020, increase or decrease a volume, increase or decrease a brightness, interact with one or more applications, and/or interact with one or more user interfaces. Additionally, or alternatively, in some embodiments, the display 6005 operates as a touch screen and allows the user to provide one or more inputs for interacting with the watch body 6020.

In some embodiments, the watch body 6020 includes one or more sensors 6021. The sensors 6021 of the watch body 6020 can be the same or distinct from the sensors 6013 of the wearable band 6010. The sensors 6021 of the watch body 6020 can be distributed on an inside and/or an outside surface of the watch body 6020. In some embodiments, the sensors 6021 are configured to contact a user's skin when the watch body 6020 is worn by the user. For example, the sensors 6021 can be placed on the bottom side of the watch body 6020 and the coupling mechanism 6016 can be a cradle with an opening that allows the bottom side of the watch body 6020 to directly contact the user's skin. Alternatively, in some embodiments, the watch body 6020 does not include sensors that are configured to contact the user's skin (e.g., including sensors internal and/or external to the watch body 6020 that configured to sense data of the watch body 6020 and the watch body 6020's surrounding environment). In some embodiment, the sensors 6013 are configured to track a position and/or motion of the watch body 6020.

The watch body 6020 and the wearable band 6010 can share data using a wired communication method (e.g., a Universal Asynchronous Receiver/Transmitter (UART) or a USB transceiver) and/or a wireless communication method (e.g., near field communication or Bluetooth). For example, the watch body 6020 and the wearable band 6010 can share data sensed by the sensors 6013 and 6021, as well as application and device specific information (e.g., active and/or available applications, output devices (e.g., display and/or speakers), input devices (e.g., touch screen, microphone, and/or imaging sensors).

In some embodiments, the watch body 6020 can include, without limitation, a front-facing camera 6025A and/or a rear-facing camera 6025B, sensors 6021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 6063; FIG. 7B), a touch sensor, and/or a sweat sensor). In some embodiments, the watch body 6020 can include one or more haptic devices 6076 (FIG. 7B; a vibratory haptic actuator) that is configured to provide haptic feedback (e.g., a cutaneous and/or kinesthetic sensation) to the user. The sensors 6021 and/or the haptic device 6076 can also be configured to operate in conjunction with multiple applications including, without limitation, health monitoring applications, social media applications, game applications, and artificial reality applications (e.g., the applications associated with artificial reality).

As described above, the watch body 6020 and the wearable band 6010, when coupled, can form the wrist-wearable device 6000. When coupled, the watch body 6020 and wearable band 6010 operate as a single device to execute functions (operations, detections, and/or communications) described herein. In some embodiments, each device is provided with particular instructions for performing the one or more operations of the wrist-wearable device 6000. For example, in accordance with a determination that the watch body 6020 does not include neuromuscular signal sensors, the wearable band 6010 can include alternative instructions for performing associated instructions (e.g., providing sensed neuromuscular signal data to the watch body 6020 via a different electronic device). Operations of the wrist-wearable device 6000 can be performed by the watch body 6020 alone or in conjunction with the wearable band 6010 (e.g., via respective processors and/or hardware components) and vice versa. In some embodiments, operations of the wrist-wearable device 6000, the watch body 6020, and/or the wearable band 6010 can be performed in conjunction with one or more processors and/or hardware components of another communicatively coupled device (e.g., the HIPD 8000; FIGS. 9A-9B).

As described below with reference to the block diagram of FIG. 7B, the wearable band 6010 and/or the watch body 6020 can each include independent resources required to independently execute functions. For example, the wearable band 6010 and/or the watch body 6020 can each include a power source (e.g., a battery), a memory, data storage, a processor (e.g., a central processing unit (CPU)), communications, a light source, and/or input/output devices.

FIG. 7B shows block diagrams of a computing system 6030 corresponding to the wearable band 6010, and a computing system 6060 corresponding to the watch body 6020, according to some embodiments. A computing system of the wrist-wearable device 6000 includes a combination of components of the wearable band computing system 6030 and the watch body computing system 6060, in accordance with some embodiments.

The watch body 6020 and/or the wearable band 6010 can include one or more components shown in watch body computing system 6060. In some embodiments, a single integrated circuit includes all or a substantial portion of the components of the watch body computing system 6060 are included in a single integrated circuit. Alternatively, in some embodiments, components of the watch body computing system 6060 are included in a plurality of integrated circuits that are communicatively coupled. In some embodiments, the watch body computing system 6060 is configured to couple (e.g., via a wired or wireless connection) with the wearable band computing system 6030, which allows the computing systems to share components, distribute tasks, and/or perform other operations described herein (individually or as a single device).

The watch body computing system 6060 can include one or more processors 6079, a controller 6077, a peripherals interface 6061, a power system 6095, and memory (e.g., a memory 6080), each of which are defined above and described in more detail below.

The power system 6095 can include a charger input 6057, a power-management integrated circuit (PMIC) 6097, and a battery 6096, each are which are defined above. In some embodiments, a watch body 6020 and a wearable band 6010 can have respective batteries (e.g., battery 6098 and 6059), and can share power with each other. The watch body 6020 and the wearable band 6010 can receive a charge using a variety of techniques. In some embodiments, the watch body 6020 and the wearable band 6010 can use a wired charging assembly (e.g., power cords) to receive the charge. Alternatively, or in addition, the watch body 6020 and/or the wearable band 6010 can be configured for wireless charging. For example, a portable charging device can be designed to mate with a portion of watch body 6020 and/or wearable band 6010 and wirelessly deliver usable power to a battery of watch body 6020 and/or wearable band 6010. The watch body 6020 and the wearable band 6010 can have independent power systems (e.g., power system 6095 and 6056) to enable each to operate independently. The watch body 6020 and wearable band 6010 can also share power (e.g., one can charge the other) via respective PMICs (e.g., PMICs 6097 and 6058) that can share power over power and ground conductors and/or over wireless charging antennas.

In some embodiments, the peripherals interface 6061 can include one or more sensors 6021, many of which listed below are defined above. The sensors 6021 can include one or more coupling sensor 6062 for detecting when the watch body 6020 is coupled with another electronic device (e.g., a wearable band 6010). The sensors 6021 can include imaging sensors 6063 (one or more of the cameras 6025, and/or separate imaging sensors 6063 (e.g., thermal-imaging sensors)). In some embodiments, the sensors 6021 include one or more SpO2 sensors 6064. In some embodiments, the sensors 6021 include one or more biopotential-signal sensors (e.g., EMG sensors 6065 and 6035, which may be disposed on a user-facing portion of the watch body 6020 and/or the wearable band 6010). In some embodiments, the sensors 6021 include one or more capacitive sensors 6066. In some embodiments, the sensors 6021 include one or more heart rate sensors 6067. In some embodiments, the sensors 6021 include one or more IMU sensors 6068. In some embodiments, one or more IMU sensors 6068 can be configured to detect movement of a user's hand or other location that the watch body 6020 is placed or held).

In some embodiments, the peripherals interface 6061 includes a near-field communication (NFC) component 6069, a global-position system (GPS) component 6070, a long-term evolution (LTE) component 6071, and/or a Wi-Fi and/or Bluetooth communication component 6072. In some embodiments, the peripherals interface 6061 includes one or more buttons 6073 (e.g., the peripheral buttons 6023 and 6027 in FIG. 7A), which, when selected by a user, cause operation to be performed at the watch body 6020. In some embodiments, the peripherals interface 6061 includes one or more indicators, such as a light emitting diode (LED), to provide a user with visual indicators (e.g., message received, low battery, active microphone and/or camera).

The watch body 6020 can include at least one display 6005, for displaying visual representations of information or data to the user, including user-interface elements and/or three-dimensional virtual objects. The display can also include a touch screen for inputting user inputs, such as touch gestures, swipe gestures, and the like. The watch body 6020 can include at least one speaker 6074 and at least one microphone 6075 for providing audio signals to the user and receiving audio input from the user. The user can provide user inputs through the microphone 6075 and can also receive audio output from the speaker 6074 as part of a haptic event provided by the haptic controller 6078. The watch body 6020 can include at least one camera 6025, including a front camera 6025A and a rear camera 6025B. The cameras 6025 can include ultra-wide-angle cameras, wide angle cameras, fish-eye cameras, spherical cameras, telephoto cameras, a depth-sensing cameras, or other types of cameras.

The watch body computing system 6060 can include one or more haptic controllers 6077 and associated componentry (e.g., haptic devices 6076) for providing haptic events at the watch body 6020 (e.g., a vibrating sensation or audio output in response to an event at the watch body 6020). The haptic controllers 6078 can communicate with one or more haptic devices 6076, such as electroacoustic devices, including a speaker of the one or more speakers 6074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 6078 can provide haptic events to that are capable of being sensed by a user of the watch body 6020. In some embodiments, the one or more haptic controllers 6078 can receive input signals from an application of the applications 6082.

In some embodiments, the computing system 6030 and/or the computing system 6060 can include memory 6080, which can be controlled by a memory controller of the one or more controllers 6077. In some embodiments, software components stored in the memory 6080 include one or more applications 6082 configured to perform operations at the watch body 6020. In some embodiments, the one or more applications 6082 include games, word processors, messaging applications, calling applications, web browsers, social media applications, media streaming applications, financial applications, calendars, and/or clocks. In some embodiments, software components stored in the memory 6080 include one or more communication interface modules 6083 as defined above. In some embodiments, software components stored in the memory 6080 include one or more graphics modules 6084 for rendering, encoding, and/or decoding audio and/or visual data; and one or more data management modules 6085 for collecting, organizing, and/or providing access to the data 6087 stored in memory 6080. In some embodiments, one or more of applications 6082 and/or one or more modules can work in conjunction with one another to perform various tasks at the watch body 6020.

In some embodiments, software components stored in the memory 6080 can include one or more operating systems 6081 (e.g., a Linux-based operating system or an Android operating system). The memory 6080 can also include data 6087. The data 6087 can include profile data 6088A, sensor data 6089A, media content data 6090, and application data 6091.

It should be appreciated that the watch body computing system 6060 is an example of a computing system within the watch body 6020, and that the watch body 6020 can have more or fewer components than shown in the watch body computing system 6060, combine two or more components, and/or have a different configuration and/or arrangement of the components. The various components shown in watch body computing system 6060 are implemented in hardware, software, firmware, or a combination thereof, including one or more signal processing and/or application-specific integrated circuits.

Turning to the wearable band computing system 6030, one or more components that can be included in the wearable band 6010 are shown. The wearable band computing system 6030 can include more or fewer components than shown in the watch body computing system 6060, combine two or more components, and/or have a different configuration and/or arrangement of some or all of the components. In some embodiments, all, or a substantial portion of the components of the wearable band computing system 6030 are included in a single integrated circuit. Alternatively, in some embodiments, components of the wearable band computing system 6030 are included in a plurality of integrated circuits that are communicatively coupled. As described above, in some embodiments, the wearable band computing system 6030 is configured to couple (e.g., via a wired or wireless connection) with the watch body computing system 6060, which allows the computing systems to share components, distribute tasks, and/or perform other operations described herein (individually or as a single device).

The wearable band computing system 6030, similar to the watch body computing system 6060, can include one or more processors 6049, one or more controllers 6047 (including one or more haptics controller 6048), a peripherals interface 6031 that can includes one or more sensors 6013 and other peripheral devices, power source (e.g., a power system 6056), and memory (e.g., a memory 6050) that includes an operating system (e.g., an operating system 6051), data (e.g., data 6054 including profile data 6088B and/or sensor data 6089B), and one or more modules (e.g., a communications interface module 6052 and/or a data management module 6053).

The one or more sensors 6013 can be analogous to sensors 6021 of the computing system 6060 and in light of the definitions above. For example, sensors 6013 can include one or more coupling sensors 6032, one or more SpO2 sensor 6034, one or more EMG sensors 6035, one or more capacitive sensor 6036, one or more heart rate sensor 6037, and one or more IMU sensor 6038.

The peripherals interface 6031 can also include other components analogous to those included in the peripheral interface 6061 of the computing system 6060, including an NFC component 6039, a GPS component 6040, an LTE component 6041, a Wi-Fi and/or Bluetooth communication component 6042, and/or one or more haptic devices 6076 as described above in reference to peripherals interface 6061. In some embodiments, the peripherals interface 6061 includes one or more buttons 6043, a display 6033, a speaker 6044, a microphone 6045, and a camera 6055. In some embodiments, the peripherals interface 6061 includes one or more indicators, such as an LED.

It should be appreciated that the wearable band computing system 6030 is an example of a computing system within the wearable band 6010, and that the wearable band 6010 can have more or fewer components than shown in the wearable band computing system 6030, combine two or more components, and/or have a different configuration and/or arrangement of the components. The various components shown in wearable band computing system 6030 can be implemented in one or a combination of hardware, software, firmware, including one or more signal processing and/or application-specific integrated circuits.

The wrist-wearable device 6000 with respect to FIG. 7A is an example of the wearable band 6010 and the watch body 6020 coupled, so the wrist-wearable device 6000 will be understood to include the components shown and described for the wearable band computing system 6030 and the watch body computing system 6060. In some embodiments, wrist-wearable device 6000 has a split architecture (e.g., a split mechanical architecture, a split electrical architecture) between the watch body 6020 and the wearable band 6010. In other words, all of the components shown in the wearable band computing system 6030 and the watch body computing system 6060 can be housed or otherwise disposed in a combined watch device 6000, or within individual components of the watch body 6020, wearable band 6010, and/or portions thereof (e.g., a coupling mechanism 6016 of the wearable band 6010).

The techniques described above can be used with any device for sensing neuromuscular signals, including the arm-wearable devices of FIG. 7A-7B, but could also be used with other types of wearable devices for sensing neuromuscular signals (such as body-wearable or head-wearable devices that might have neuromuscular sensors closer to the brain or spinal column).

In some embodiments, a wrist-wearable device 6000 can be used in conjunction with a head-wearable device described below (e.g., AR system 7000 and VR headset 7010) and/or an HIPD 8000; and the wrist-wearable device 6000 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). In some embodiments, a wrist-wearable device 6000 can also be used in conjunction with a wearable garment, such as the wearable gloves described below in reference to FIGS. 10A-10C. Having thus described example wrist-wearable device, attention will now be turned to example head-wearable devices, such AR system 7000 and VR headset 7010.

Example Head-Wearable Devices

Figure 8A:
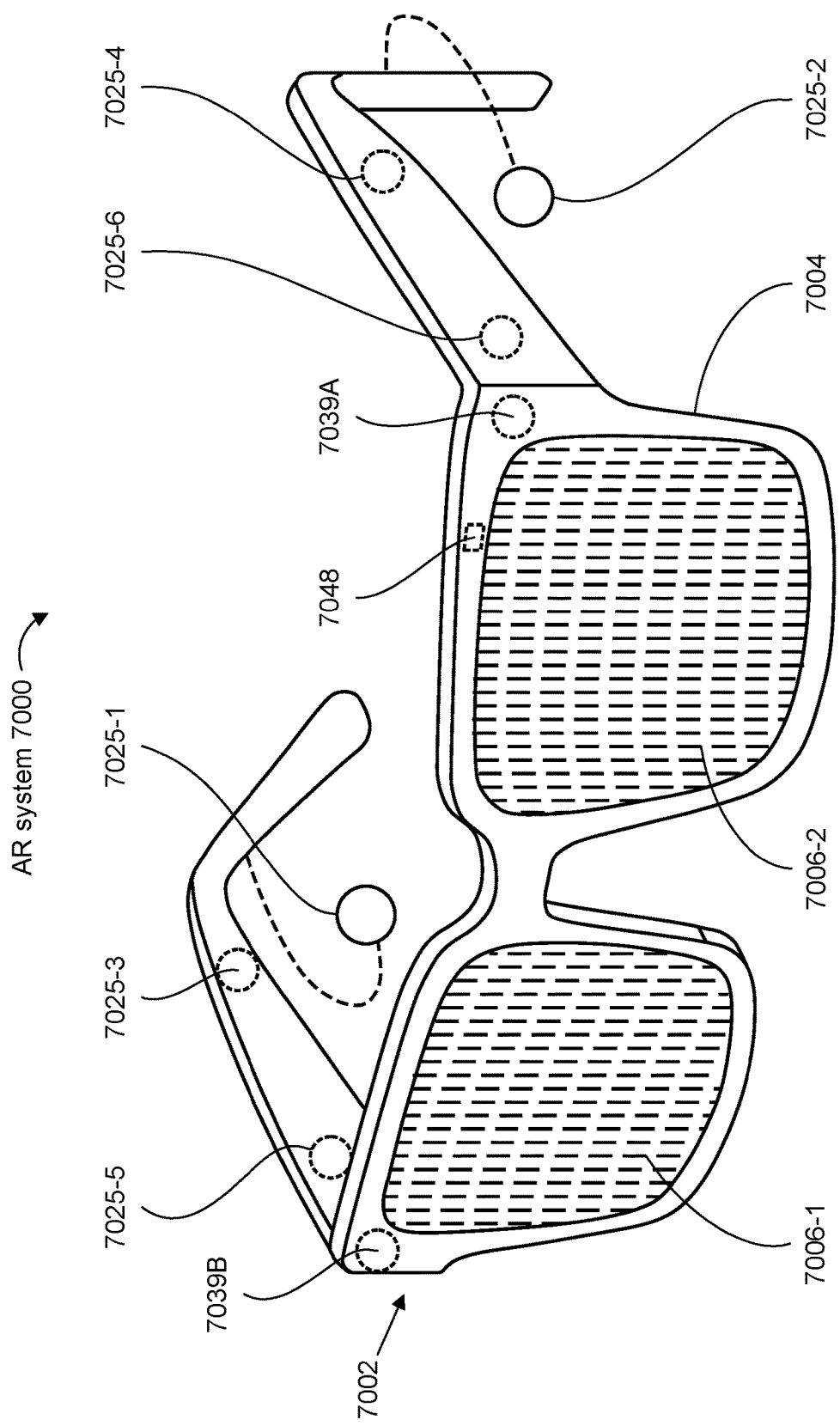
Figures 1, 8B:
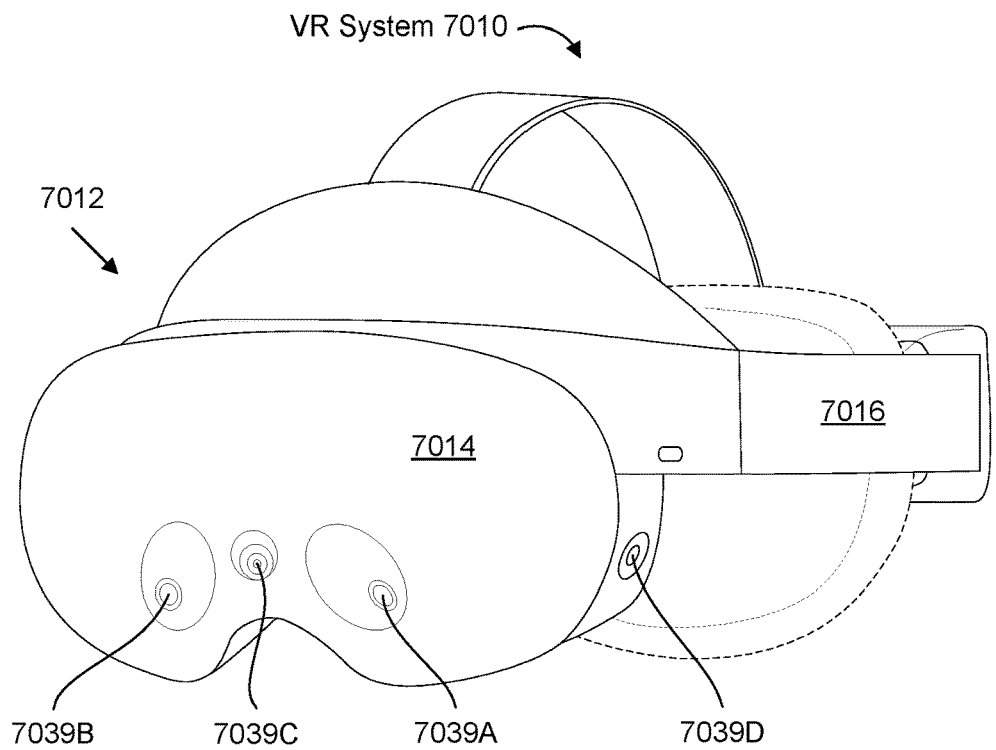
Figures 2, 8B:
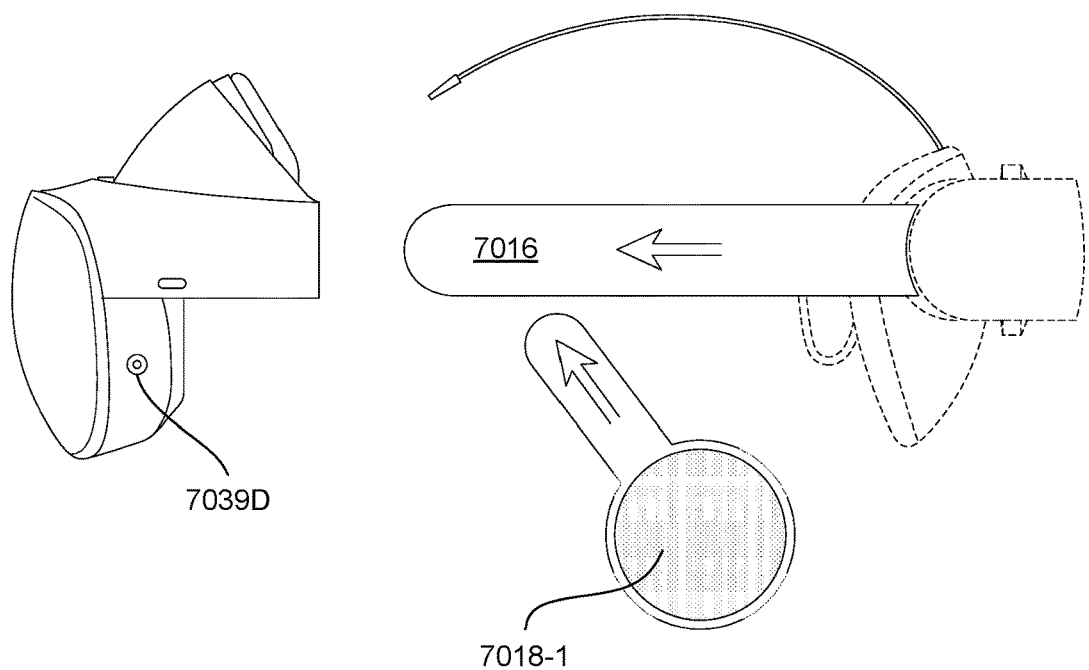
Figure 8C:
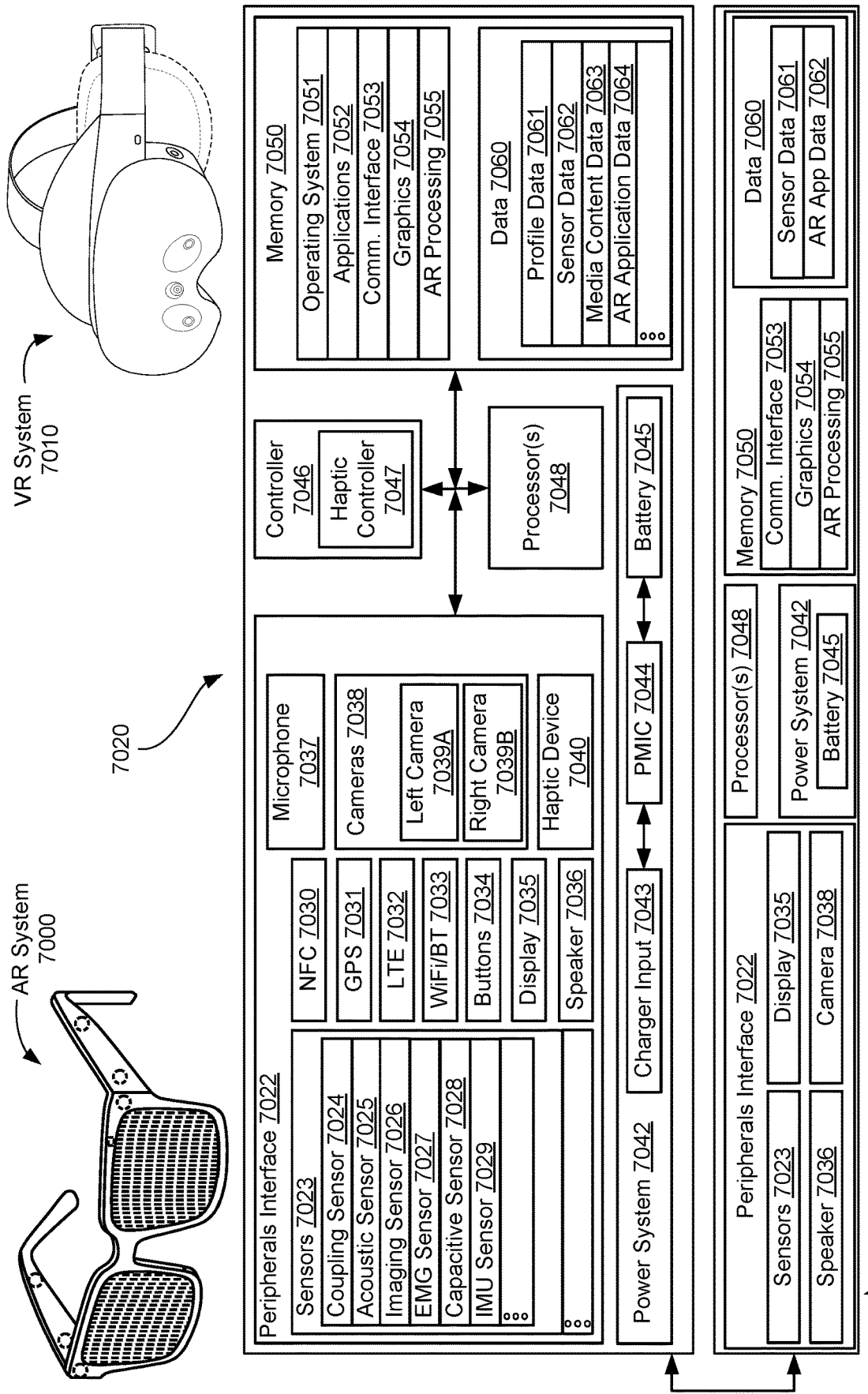

FIGS. 8A to 8C show example artificial-reality systems, including the AR system 7000. In some embodiments, the AR system 7000 is an eyewear device as shown in FIG. 8A. In some embodiments, the VR system 7010 includes a head-mounted display (HMD) 7012, as shown in FIGS. 8B-1 and 8B-2. In some embodiments, the AR system 7000 and the VR system 7010 include one or more analogous components (e.g., components for presenting interactive artificial-reality environments, such as processors, memory, and/or presentation devices, including one or more displays and/or one or more waveguides), some of which are described in more detail with respect to FIG. 8C. As described herein, a head-wearable device can include components of the eyewear device 7002, and/or the head-mounted display 7012. Some embodiments of head-wearable devices do not include any displays, including any of the displays described with respect to the AR system 7000 and/or the VR system 7010. While the example artificial-reality systems are respectively described herein as the AR system 7000 and the VR system 7010, either or both of the example AR systems described herein can be configured to present fully-immersive VR scenes presented in substantially all of a user's field of view, additionally or alternatively to, subtler augmented-reality scenes that are presented within a portion, less than all, of the user's field of view.

FIG. 8A show an example visual depiction of the AR system 7000 (which may also be described herein as augmented-reality glasses, and/or smart glasses). The AR system 7000 can include additional electronic components that are not shown in FIGS. 8A, such as a wearable accessory device and/or an intermediary processing device, in electronic communication or otherwise configured to be used in conjunction with the eyewear device. In some embodiments, the wearable accessory device and/or the intermediary processing device may be configured to couple with the eyewear device via a coupling mechanism in electronic communication with a coupling sensor 7024, where the coupling sensor 7024 can detect when an electronic device becomes physically or electronically coupled with the eyewear device. In some embodiments, the eyewear device is configured to couple to a housing 7090, which may include one or more additional coupling mechanisms configured to couple with additional accessory devices. The components shown in FIG. 8A can be implemented in hardware, software, firmware, or a combination thereof, including one or more signal-processing components and/or application-specific integrated circuits (ASICs).

The eyewear device includes mechanical glasses components, including a frame 7004 configured to hold one or more lenses (e.g., one or both lenses 7006-1 and 7006-2). One of ordinary skill in the art will appreciate that the eyewear device can include additional mechanical components, such as hinges configured to allow portions of the frame 7004 of the eyewear device 7002 to be folded and unfolded, a bridge configured to span the gap between the lenses 7006-1 and 7006-2 and rest on the user's nose, nose pads configured to rest on the bridge of the nose and provide support for the eyewear device, earpieces configured to rest on the user's ears and provide additional support for the eyewear device, temple arms configured to extend from the hinges to the earpieces of the eyewear device, and the like. One of ordinary skill in the art will further appreciate that some examples of the AR system 7000 can include none of the mechanical components described herein. For example, smart contact lenses configured to present artificial reality to users may not include any components of the eyewear device.

The eyewear device includes electronic components, many of which will be described in more detail below with respect to FIG. 8C. Some example electronic components are illustrated in FIG. 8A, including acoustic sensors 7025-1, 7025-2, 7025-3, 7025-4, 7025-5, and 7025-1, which can be distributed along a substantial portion of the frame 7004 of the eyewear device. The eyewear device also includes a left camera 7039A and a right camera 7039B, which are located on different sides of the frame 7004. And the eyewear device includes a processor 7048 (e.g., an integral microprocessor, such as an ASIC) that is embedded into a portion of the frame 7004.

FIGS. 8B-1 and 8B-2 show a VR system 7010 that includes a head-mounted display (HMD) 7012 (e.g., also referred to herein as an artificial-reality headset, a head-wearable device, or a VR headset), in accordance with some embodiments. As noted, some artificial-reality systems may (e.g., the AR system 7000), instead of blending an artificial reality with actual reality, substantially replace one or more of a user's sensory perceptions of the real world with a virtual experience (e.g., the AR systems 5000c and 5000d).

The HMD 7012 includes a front body 7014 and a frame 7016 (e.g., a strap or band) shaped to fit around a user's head. In some embodiments, the front body 7014 and/or the frame 7016 includes one or more electronic elements for facilitating presentation of and/or interactions with an AR and/or VR system (e.g., displays, IMUs, tracking emitter or detectors). In some embodiments, the HMD 7012 includes output audio transducers (e.g., an audio transducer 7018-1), as shown in FIG. 8B-2. In some embodiments, one or more components, such as the output audio transducer(s) 7018-1 and the frame 7016, can be configured to attach and detach (e.g., are detachably attachable) to the HMD 7012 (e.g., a portion or all of the frame 7016, and/or the audio transducer 7018-1), as shown in FIG. 8B-2. In some embodiments, coupling a detachable component to the HMD 7012 causes the detachable component to come into electronic communication with the HMD 7012.

FIGS. 8B-1 to 8B-2 also show that the VR system 7010 one or more cameras, such as the left camera 7039A and the right camera 7039B, which can be analogous to the left and right cameras on the frame 7004 of the eyewear device 7002. In some embodiments, the VR system 7010 includes one or more additional cameras (e.g., cameras 7039C and 7039D), which can be configured to augment image data obtained by the cameras 7039A and 7039B by providing more information. For example, the camera 7039C can be used to supply color information that is not discerned by cameras 7039A and 7039B. In some embodiments, one or more of the cameras 7039A to 7039D can include an optional IR cut filter configured to remove IR light from being received at the respective camera sensors.

FIG. 8C illustrates a computing system 7020 and an optional housing 7090, each of which show components that can be included in the AR system 7000 and/or the VR system 7010. In some embodiments, more or less components can be included in the optional housing 7090 depending on practical restraints of the respective AR system being described.

In some embodiments, the computing system 7020 and/or the optional housing 7090 can include one or more peripheral interfaces 7022, one or more power systems 7042, one or more controllers 7046 (including one or more haptic controllers 7047), one or more processors 7048 (as defined above, including any of the examples provided), and memory 7050, which can all be in electronic communication with each other. For example, the one or more processors 7048 can be configured to execute instructions stored in the memory 7050, which can cause a controller of the one or more controllers 7046 to cause operations to be performed at one or more peripheral devices of the peripherals interface 7022. In some embodiments, each operation described can occur based on electrical power provided by the power system 7042.

In some embodiments, the peripherals interface 7022 can include one or more devices configured to be part of the computing system 7020, many of which have been defined above and/or described with respect to wrist-wearable devices shown in FIGS. 7A and 7B. For example, the peripherals interface can include one or more sensors 7023. Some example sensors include: one or more coupling sensors 7024, one or more acoustic sensors 7025, one or more imaging sensors 7026, one or more EMG sensors 7027, one or more capacitive sensors 7028, and/or one or more IMU sensors 7029; and/or any other types of sensors defined above or described with respect to any other embodiments discussed herein.

In some embodiments, the peripherals interface can include one or more additional peripheral devices, including one or more NFC devices 7030, one or more GPS devices 7031, one or more LTE devices 7032, one or more Wi-Fi and/or Bluetooth devices 7033, one or more buttons 7034 (e.g., including buttons that are slidable or otherwise adjustable), one or more displays 7035, one or more speakers 7036, one or more microphones 7037, one or more cameras 7038 (e.g., including the left camera 7039A and/or a right camera 7039B), and/or one or more haptic devices 7040;

and/or any other types of peripheral devices defined above or described with respect to any other embodiments discussed herein.

AR systems can include a variety of types of visual feedback mechanisms (e.g., presentation devices). For example, display devices in the AR system 7000 and/or the VR system 7010 can include one or more liquid-crystal displays (LCDs), light emitting diode (LED) displays, organic LED (OLED) displays, and/or any other suitable types of display screens. Artificial-reality systems can include a single display screen (e.g., configured to be seen by both eyes), and/or can provide separate display screens for each eye, which can allow for additional flexibility for varifocal adjustments and/or for correcting a refractive error associated with the user's vision. Some embodiments of AR systems also include optical subsystems having one or more lenses (e.g., conventional concave or convex lenses, Fresnel lenses, or adjustable liquid lenses) through which a user can view a display screen.

For example, respective displays can be coupled to each of the lenses 7006-1 and 7006-2 of the AR system 7000. The displays coupled to each of the lenses 7006-1 and 7006-2 can act together or independently to present an image or series of images to a user. In some embodiments, the AR system 7000 includes a single display (e.g., a near-eye display) or more than two displays. In some embodiments, a first set of one or more displays can be used to present an augmented-reality environment, and a second set of one or more display devices can be used to present a virtual-reality environment. In some embodiments, one or more waveguides are used in conjunction with presenting artificial-reality content to the user of the AR system 7000 (e.g., as a means of delivering light from one or more displays to the user's eyes). In some embodiments, one or more waveguides are fully or partially integrated into the eyewear device 7002. Additionally, or alternatively to display screens, some artificial-reality systems include one or more projection systems. For example, display devices in the AR system 7000 and/or the virtual-reality system 7010 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. Artificial-reality systems can also be configured with any other suitable type or form of image projection system. In some embodiments, one or more waveguides are provided additionally or alternatively to the one or more display(s).

The computing system 7020 and/or the optional housing 7090 of the AR system 7000 or the VR system 7010 can include some or all of the components of a power system 7042. The power system 7042 can include one or more charger inputs 7043, one or more PMICs 7044, and/or one or more batteries 7045.

The memory 7050 includes instructions and data, some or all of which may be stored as non-transitory computer-readable storage media within the memory 7050. For example, the memory 7050 can include one or more operating systems 7051; one or more applications 7052; one or more communication interface applications 7053; one or more graphics applications 7054; one or more AR processing applications 7055; and/or any other types of data defined above or described with respect to any other embodiments discussed herein.

The memory 7050 also includes data 7060 which can be used in conjunction with one or more of the applications discussed above. The data 7060 can include: profile data 7061; sensor data 7062; media content data 7063; AR application data 7064; and/or any other types of data defined above or described with respect to any other embodiments discussed herein.

In some embodiments, the controller 7046 of the eyewear device 7002 processes information generated by the sensors 7023 on the eyewear device 7002 and/or another electronic device within the AR system 7000. For example, the controller 7046 can process information from the acoustic sensors 7025-1 and 7025-2. For each detected sound, the controller 7046 can perform a direction of arrival (DOA) estimation to estimate a direction from which the detected sound arrived at the eyewear device 7002 of the AR system 7000. As one or more of the acoustic sensors 7025 detects sounds, the controller 7046 can populate an audio data set with the information (e.g., represented in FIG. 8C as sensor data 7062).

In some embodiments, a physical electronic connector can convey information between the eyewear device and another electronic device, and/or between one or more processors of the AR system 7000 or the VR system 7010 and the controller 7046. The information can be in the form of optical data, electrical data, wireless data, or any other transmittable data form. Moving the processing of information generated by the eyewear device to an intermediary processing device can reduce weight and heat in the eyewear device, making it more comfortable and safer for a user. In some embodiments, an optional wearable accessory device (e.g., an electronic neckband) is coupled to the eyewear device via one or more connectors. The connectors can be wired or wireless connectors and can include electrical and/or non-electrical (e.g., structural) components. In some embodiments, the eyewear device and the wearable accessory device can operate independently without any wired or wireless connection between them.

In some situations, pairing external devices, such as an intermediary processing device (e.g., the HIPD 8000) with the eyewear device 7002 (e.g., as part of the AR system 7000) enables the eyewear device 7002 to achieve a similar form factor of a pair of glasses while still providing sufficient battery and computation power for expanded capabilities. Some, or all, of the battery power, computational resources, and/or additional features of the AR system 7000 can be provided by a paired device or shared between a paired device and the eyewear device 7002, thus reducing the weight, heat profile, and form factor of the eyewear device 7002 overall while allowing the eyewear device 7002 to retain its desired functionality. For example, the wearable accessory device can allow components that would otherwise be included on an eyewear device 7002 to be included in the wearable accessory device and/or intermediary processing device, thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the eyewear device 7002, standing alone. Because weight carried in the wearable accessory device can be less invasive to a user than weight carried in the eyewear device 7002, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

AR systems can include various types of computer vision components and subsystems. For example, the AR system 7000 and/or the VR system 7010 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. An AR system can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate digital twins (e.g., interactable virtual objects), among a variety of other functions. For example, FIGS. 8B-1 and 8B-2 show the VR system 7010 having cameras 7039A to 7039D, which can be used to provide depth information for creating a voxel field and a two-dimensional mesh to provide object information to the user to avoid collisions.

In some embodiments, the AR system 7000 and/or the VR system 7010 can include haptic (tactile) feedback systems, which may be incorporated into headwear, gloves, body suits, handheld controllers, environmental devices (e.g., chairs or floormats), and/or any other type of device or system, such as the wearable devices discussed herein. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback may be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., the haptic feedback system described with respect to FIGS. 10A to 10C).

In some embodiments of an AR system, such as the AR system 7000 and/or the VR system 7010, ambient light (e.g., a live feed of the surrounding environment that a user would normally see) can be passed through a display element of a respective head-wearable device presenting aspects of the AR system. In some embodiments, ambient light can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment. For example, a visual user interface element (e.g., a notification user interface element) can be presented at the head-wearable device, and an amount of ambient light (e.g., 15-50% of the ambient light) can be passed through the user interface element, such that the user can distinguish at least a portion of the physical environment over which the user interface element is being displayed.

Example Handheld Intermediary Processing Devices

Figure 9A:
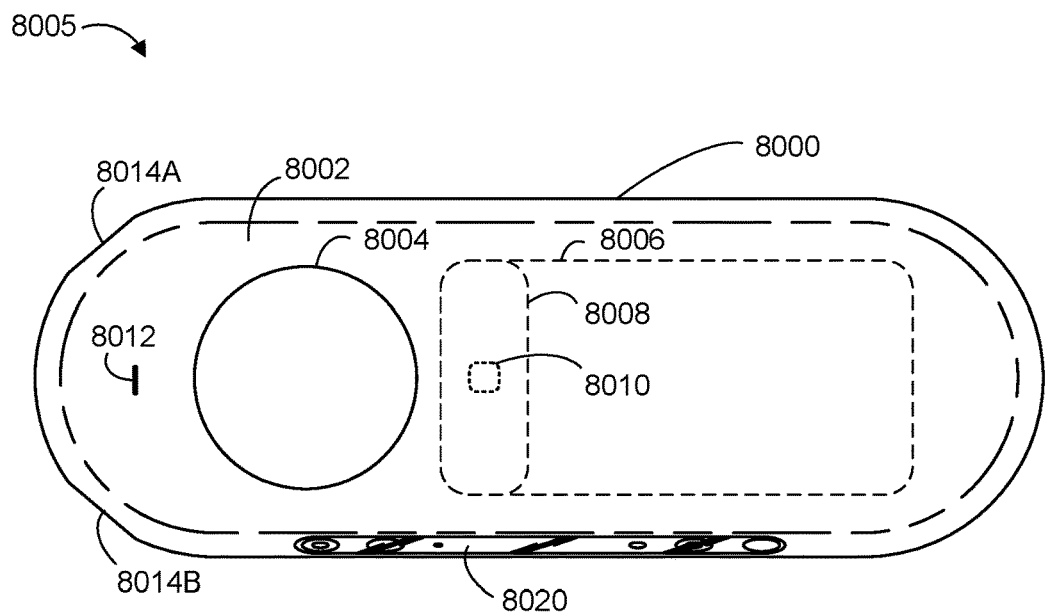
FIGS. 9A-9B illustrate an example handheld device in accordance with some embodiments.
Figure 9A:
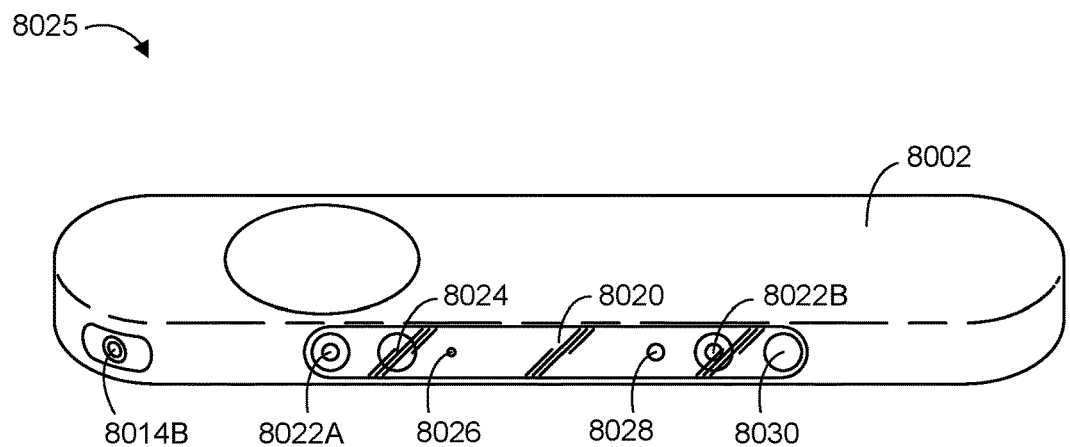
Figure 9B:
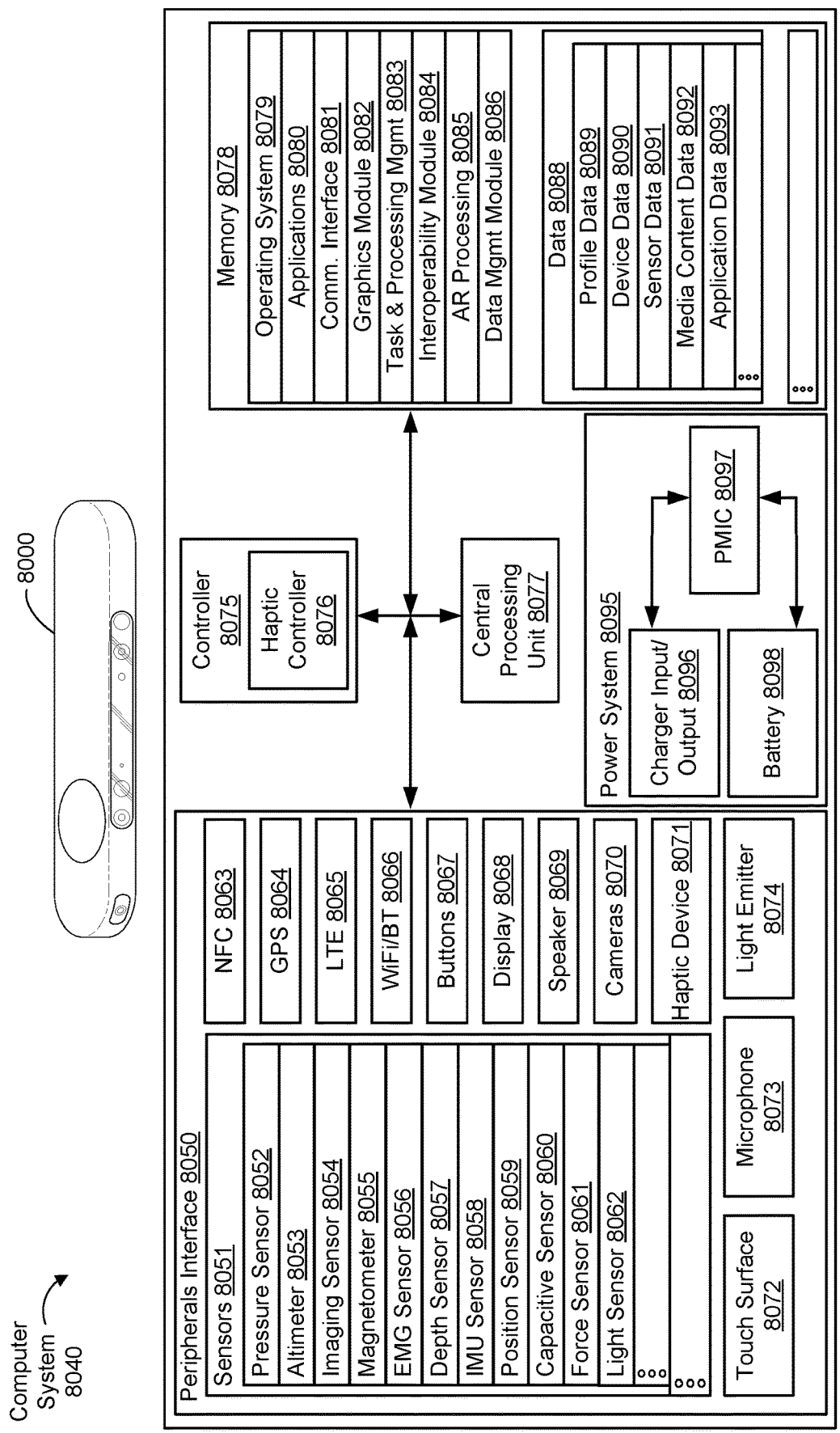

FIGS. 9A and 9B illustrate an example handheld intermediary processing device (HIPD) 8000, in accordance with some embodiments. The HIPD 8000 is an instance of the intermediary device described herein, such that the HIPD 8000 should be understood to have the features described with respect to any intermediary device defined above or otherwise described herein, and vice versa. FIG. 9A shows a top view 8005 and a side view 8025 of the HIPD 8000. The HIPD 8000 is configured to communicatively couple with one or more wearable devices (or other electronic devices) associated with a user. For example, the HIPD 8000 is configured to communicatively couple with a user's wrist-wearable device 6000 (or components thereof, such as the watch body 6020 and the wearable band 6010), AR system 7000, and/or VR headset 7010. The HIPD 8000 can be configured to be held by a user (e.g., as a handheld controller), carried on the user's person (e.g., in their pocket or in their bag), placed in proximity of the user (e.g., placed on their desk while seated at their desk or on a charging dock), and/or placed at or within a predetermined distance from a wearable device or other electronic device (e.g., where, in some embodiments, the predetermined distance is the maximum distance (e.g., 10 meters) at which the HIPD 8000 can successfully be communicatively coupled with an electronic device, such as a wearable device).

The HIPD 8000 can perform various functions independently and/or in conjunction with one or more wearable devices (e.g., wrist-wearable device 6000, AR system 7000, and/or VR headset 7010). The HIPD 8000 is configured to increase and/or improve the functionality of communicatively coupled devices, such as the wearable devices. The HIPD 8000 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 8000 can include, without limitation, task offloading and/or handoffs; thermals offloading and/or handoffs; 6 degrees of freedom (6DoF) raycasting and/or gaming (e.g., using imaging devices or cameras 8014, which can be used for simultaneous localization and mapping (SLAM) and/or with other image processing techniques); portable charging; messaging; image capturing via one or more imaging devices or cameras 8022; sensing user input (e.g., sensing a touch on a touch input surface 8002); wireless communications and/or interlining (e.g., cellular, near field, Wi-Fi, or personal area network); location determination; financial transactions; providing haptic feedback; alarms; notifications; biometric authentication; health monitoring; and sleep monitoring. The above-example functions can be executed independently in the HIPD 8000 and/or in communication between the HIPD 8000 and another wearable device described herein. In some embodiments, functions can be executed on the HIPD 8000 in conjunction with an AR environment. As the skilled artisan will appreciate upon reading the descriptions provided herein, the novel the HIPD 8000 described herein can be used with any type of suitable AR environment.

While the HIPD 8000 is communicatively coupled with a wearable device and/or other electronic device, the HIPD 8000 is configured to perform one or more operations initiated at the wearable device and/or the other electronic device. In particular, one or more operations of the wearable device and/or the other electronic device can be offloaded to the HIPD 8000 to be performed. The HIPD 8000 performs the one or more operations of the wearable device and/or the other electronic device and provides to data corresponded to the completed operations to the wearable device and/or the other electronic device. For example, a user can initiate a video stream using AR system 7000 and back-end tasks associated with performing the video stream (e.g., video rendering) can be offloaded to the HIPD 8000, which the HIPD 8000 performs and provides corresponding data to the AR system 7000 to perform remaining front-end tasks associated with the video stream (e.g., presenting the rendered video data via a display of the AR system 7000). In this way, the HIPD 8000, which has more computational resources and greater thermal headroom than a wearable device, can perform computationally intensive tasks for the wearable device improving performance of an operation performed by the wearable device.

The HIPD 8000 includes a multi-touch input surface 8002 on a first side (e.g., a front surface) that is configured to detect one or more user inputs. In particular, the multi-touch input surface 8002 can detect single tap inputs, multi-tap inputs, swipe gestures and/or inputs, force-based and/or pressure-based touch inputs, held taps, and the like. The multi-touch input surface 8002 is configured to detect capacitive touch inputs and/or force (and/or pressure) touch inputs. The multi-touch input surface 8002 includes a touch-input surface 8004 defined by a surface depression, and a touch-input zone 8006 defined by a substantially planar portion. The touch-input surface 8004 can be disposed adjacent to the touch-input zone 8006. In some embodiments, the touch-input surface 8004 and the touch-input zone 8006 can be different dimensions, shapes, and/or cover different portions of the multi-touch input surface 8002. For example, the touch-input surface 8004 can be substantially circular and the touch-input zone 8006 is substantially rectangular. In some embodiments, the surface depression of the multi-touch input surface 8002 is configured to guide user handling of the HIPD 8000. In particular, the surface depression is configured such that the user holds the HIPD 8000 upright when held in a single hand (e.g., such that the using imaging devices or cameras 8014A and 8014B are pointed toward a ceiling or the sky). Additionally, the surface depression is configured such that the user's thumb rests within the touch-input surface 8004.

In some embodiments, the different touch-input surfaces include a plurality of touch-input zones. For example, the touch-input zone 8006 includes at least a touch-input zone 8008 within a touch-input zone 8006 and a touch-input zone 8010 within the touch-input zone 8008. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the touch-input zone 8008 causes the HIPD 8000 to perform a first command and a user input detected within the touch-input zone 8006 causes the HIPD 8000 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the touch-input zone 8008 can be configured to detect force touch inputs (e.g., a magnitude at which the user presses down) and capacitive touch inputs, and the touch-input zone 8006 can be configured to detect capacitive touch inputs.

The HIPD 8000 includes one or more sensors 8051 for sensing data used in the performance of one or more operations and/or functions. For example, the HIPD 8000 can include an IMU sensor that is used in conjunction with cameras 8014 for 3-dimensional object manipulation (e.g., enlarging, moving, or destroying an object) in an AR or VR environment. Non-limiting examples of the sensors 8051 included in the HIPD 8000 include a light sensor, a magnetometer, a depth sensor, a pressure sensor, and a force sensor. Additional examples of the sensors 8051 are provided below in reference to FIG. 9B.

The HIPD 8000 can include one or more light indicators 8012 to provide one or more notifications to the user. In some embodiments, the light indicators are LEDs or other types of illumination devices. The light indicators 8012 can operate as a privacy light to notify the user and/or others near the user that an imaging device and/or microphone are active. In some embodiments, a light indicator is positioned adjacent to one or more touch-input surfaces. For example, a light indicator can be positioned around the touch-input surface 8004. The light indicators can be illuminated in different colors and/or patterns to provide the user with one or more notifications and/or information about the device. For example, a light indicator positioned around the touch-input surface 8004 can flash when the user receives a notification (e.g., a message), change to red when the HIPD 8000 is out of power, operate as a progress bar (e.g., a light ring that is closed when a task is completed (e.g., 0% to 100%)), or operate as a volume indicator).

In some embodiments, the HIPD 8000 includes one or more additional sensors on another surface. For example, as shown FIG. 9A, HIPD 8000 includes a set of one or more sensors (e.g., sensor set 8020) on an edge of the HIPD 8000. The sensor set 8020, when positioned on an edge of the of the HIPD 8000, can be pe positioned at a predetermined tilt angle (e.g., 26 degrees), which allows the sensor set 8020 to be angled toward the user when placed on a desk or other flat surface. Alternatively, in some embodiments, the sensor set 8020 is positioned on a surface opposite the multi-touch input surface 8002 (e.g., a back surface). The one or more sensors of the sensor set 8020 are discussed in detail below.

The side view 8025 of the of the HIPD 8000 shows the sensor set 8020 and camera 8014B. The sensor set 8020 includes one or more cameras 8022A and 8022B, a depth projector 8024, an ambient light sensor 8028, and a depth receiver 8030. In some embodiments, the sensor set 8020 includes a light indicator 8026. The light indicator 8026 can operate as a privacy indicator to let the user and/or those around them know that a camera and/or microphone is active. The sensor set 8020 is configured to capture a user's facial expression such that the user can puppet a custom avatar (e.g., showing emotions, such as smiles and/or laughter on the avatar or a digital representation of the user). The sensor set 8020 can be configured as a side stereo RGB system, a rear indirect Time-of-Flight (iToF) system, or a rear stereo RGB system. As the skilled artisan will appreciate upon reading the descriptions provided herein, the HIPD 8000 described herein can use different sensor set 8020 configurations and/or sensor set 8020 placements.

In some embodiments, the HIPD 8000 includes one or more haptic devices 8071 (e.g., a vibratory haptic actuator) that are configured to provide haptic feedback (e.g., kinesthetic sensation). The sensors 8051, and/or the haptic devices 8071 can be configured to operate in conjunction with multiple applications and/or communicatively coupled devices including, without limitation, wearable devices, health monitoring applications, social media applications, game applications, and artificial reality applications (e.g., the applications associated with artificial reality).

The HIPD 8000 is configured to operate without a display. However, in optional embodiments, the HIPD 8000 can include a display 8068 (FIG. 9B). The HIPD 8000 can also income one or more optional peripheral buttons 8067 (FIG. 9B). For example, the peripheral buttons 8067 can be used to turn on or turn off the HIPD 8000. Further, the HIPD 8000 housing can be formed of polymers and/or elastomer elastomers. The HIPD 8000 can be configured to have a non-slip surface to allow the HIPD 8000 to be placed on a surface without requiring a user to watch over the HIPD 8000. In other words, the HIPD 8000 is designed such that it would not easily slide off surfaces. In some embodiments, the HIPD 8000 include one or magnets to couple the HIPD 8000 to another surface. This allows the user to mount the HIPD 8000 to different surfaces and provide the user with greater flexibility in use of the HIPD 8000.

As described above, the HIPD 8000 can distribute and/or provide instructions for performing the one or more tasks at the HIPD 8000 and/or a communicatively coupled device. For example, the HIPD 8000 can identify one or more back-end tasks to be performed by the HIPD 8000 and one or more front-end tasks to be performed by a communicatively coupled device. While the HIPD 8000 is configured to offload and/or handoff tasks of a communicatively coupled device, the HIPD 8000 can perform both back-end and front-end tasks (e.g., via one or more processors, such as CPU 8077; FIG. 9B). The HIPD 8000 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 8000 can perform the above operations alone or in conjunction with a wearable device (or other communicatively coupled electronic device).

FIG. 9B shows block diagrams of a computing system 8040 of the HIPD 8000, in accordance with some embodiments. The HIPD 8000, described in detail above, can include one or more components shown in HIPD computing system 8040. The HIPD 8000 will be understood to include the components shown and described below for the HIPD computing system 8040. In some embodiments, all, or a substantial portion of the components of the HIPD computing system 8040 are included in a single integrated circuit. Alternatively, in some embodiments, components of the HIPD computing system 8040 are included in a plurality of integrated circuits that are communicatively coupled.

The HIPD computing system 8040 can include a processor (e.g., a CPU 8077, a GPU, and/or a CPU with integrated graphics), a controller 8075, a peripherals interface 8050 that includes one or more sensors 8051 and other peripheral devices, a power source (e.g., a power system 8095), and memory (e.g., a memory 8078) that includes an operating system (e.g., an operating system 8079), data (e.g., data 8088), one or more applications (e.g., applications 8080), and one or more modules (e.g., a communications interface module 8081, a graphics module 8082, a task and processing management module 8083, an interoperability module 8084, an AR processing module 8085, and/or a data management module 8086). The HIPD computing system 8040 further includes a power system 8095 that includes a charger input and output 8096, a PMIC 8097, and a battery 8098, all of which are defined above.

In some embodiments, the peripherals interface 8050 can include one or more sensors 8051. The sensors 8051 can include analogous sensors to those described above in reference to FIG. 7B. For example, the sensors 8051 can include imaging sensors 8054, (optional) EMG sensors 8056, IMU sensors 8058, and capacitive sensors 8060. In some embodiments, the sensors 8051 can include one or more pressure sensor 8052 for sensing pressure data, an altimeter 8053 for sensing an altitude of the HIPD 8000, a magnetometer 8055 for sensing a magnetic field, a depth sensor 8057 (or a time-of flight sensor) for determining a difference between the camera and the subject of an image, a position sensor 8059 (e.g., a flexible position sensor) for sensing a relative displacement or position change of a portion of the HIPD 8000, a force sensor 8061 for sensing a force applied to a portion of the HIPD 8000, and a light sensor 8062 (e.g., an ambient light sensor) for detecting an amount of lighting. The sensors 8051 can include one or more sensors not shown in FIG. 10B.

Analogous to the peripherals described above in reference to FIGS. 7B, the peripherals interface 8050 can also include an NFC component 8063, a GPS component 8064, an LTE component 8065, a Wi-Fi and/or Bluetooth communication component 8066, a speaker 8069, a haptic device 8071, and a microphone 8073. As described above in reference to FIG. 9A, the HIPD 8000 can optionally include a display 8068 and/or one or more buttons 8067. The peripherals interface 8050 can further include one or more cameras 8070, touch surfaces 8072, and/or one or more light emitters 8074. The multi-touch input surface 8002 described above in reference to FIG. 9A is an example of touch surface 8072. The light emitters 8074 can be one or more LEDs and/or lasers, and can be used to project or present information to a user. For example, the light emitters 8074 can include light indicators 8012 and 8026 described above in reference to FIG. 9A. The cameras 8070 (e.g., cameras 8014 and 8022 described above in FIG. 9A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 8070 can be used for SLAM; 6 DoF ray casting, gaming, object manipulation, and/or other rendering; and/or facial recognition and facial expression recognition.

Similar to the watch body computing system 6060 and the watch band computing system 6030 described above in reference to FIG. 7B, the HIPD computing system 8040 can include one or more haptic controllers 8076 and associated componentry (e.g., haptic devices 8071) for providing haptic events at the HIPD 8000.

Memory 8078 can include high-speed random-access memory and/or non-volatile memory, such as one or more magnetic disk storage devices, flash memory devices, or other non-volatile solid-state memory devices. Access to the memory 8078 by other components of the HIPD 8000, such as the one or more processors and the peripherals interface 8050, can be controlled by a memory controller of the controllers 8075.

In some embodiments, software components stored in the memory 8078 include one or more operating systems 8079, one or more applications 8080, one or more communication interface modules 8081, one or more graphics modules 8082, one or more data management modules 8086, which are analogous to the software components described above in reference to FIG. 7B.

In some embodiments, software components stored in the memory 8078 include a task and processing management module 8083 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 8083 uses data 8088 (e.g., device data 8090) to distribute the one or more front-end and/or back-end tasks based on communicatively coupled devices' computing resources, available power, thermal headroom, ongoing operations, and/or other factors. For example, the task and processing management module 8083 can cause the performance of one or more back-end tasks (of an operation performed at communicatively coupled AR system 7000) at the HIPD 8000 in accordance with a determination that the operation is utilizing a predetermined amount (e.g., at least 70%) of computing resources available at the AR system 7000.

In some embodiments, software components stored in the memory 8078 include an interoperability module 8084 for exchanging and utilizing information received and/or provided to distinct communicatively coupled devices. The interoperability module 8084 allows for different systems, devices, and/or applications to connect and communicate in a coordinated way without user input. In some embodiments, software components stored in the memory 8078 include an AR module 8085 that is configured to process signals based at least on sensor data for use in an AR and/or VR environment. For example, the AR module 8085 can be used for 3D object manipulation, gesture recognition, facial and facial expression, and/or recognition.

The memory 8078 can also include data 8088, including structured data. In some embodiments, the data 8088 includes profile data 8089, device data 8090 (including device data of one or more devices communicatively coupled with the HIPD 8000, such as device type, hardware, software, and/or configurations), sensor data 8091, media content data 8092, and application data 8093.

It should be appreciated that the HIPD computing system 8040 is an example of a computing system within the HIPD 8000, and that the HIPD 8000 can have more or fewer components than shown in the HIPD computing system 8040, combine two or more components, and/or have a different configuration and/or arrangement of the components. The various components shown in HIPD computing system 8040 are implemented in hardware, software, firmware, or a combination thereof, including one or more signal processing and/or application-specific integrated circuits.

The techniques described above in FIG. 9A-9B can be used with any device used as a human-machine interface controller. In some embodiments, an HIPD 8000 can be used in conjunction with one or more wearable device such as a head-wearable device (e.g., AR system 7000 and VR system 7010) and/or a wrist-wearable device 6000 (or components thereof). In some embodiments, an HIPD 8000 is used in conjunction with a wearable garment, such as the wearable gloves of FIGS. 10A-10C. Having thus described example HIPD 8000, attention will now be turned to example feedback devices, such as device 9000.

Example Feedback Devices

Figure 10B:
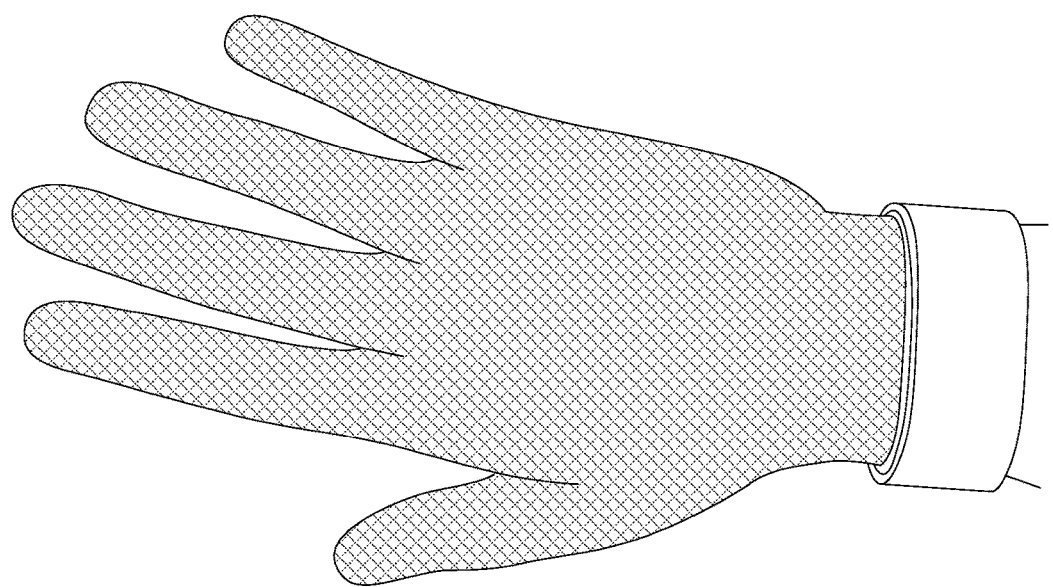
FIGS. 10A-10C illustrate example wearable gloves in accordance with some embodiments.
Figure 10A:
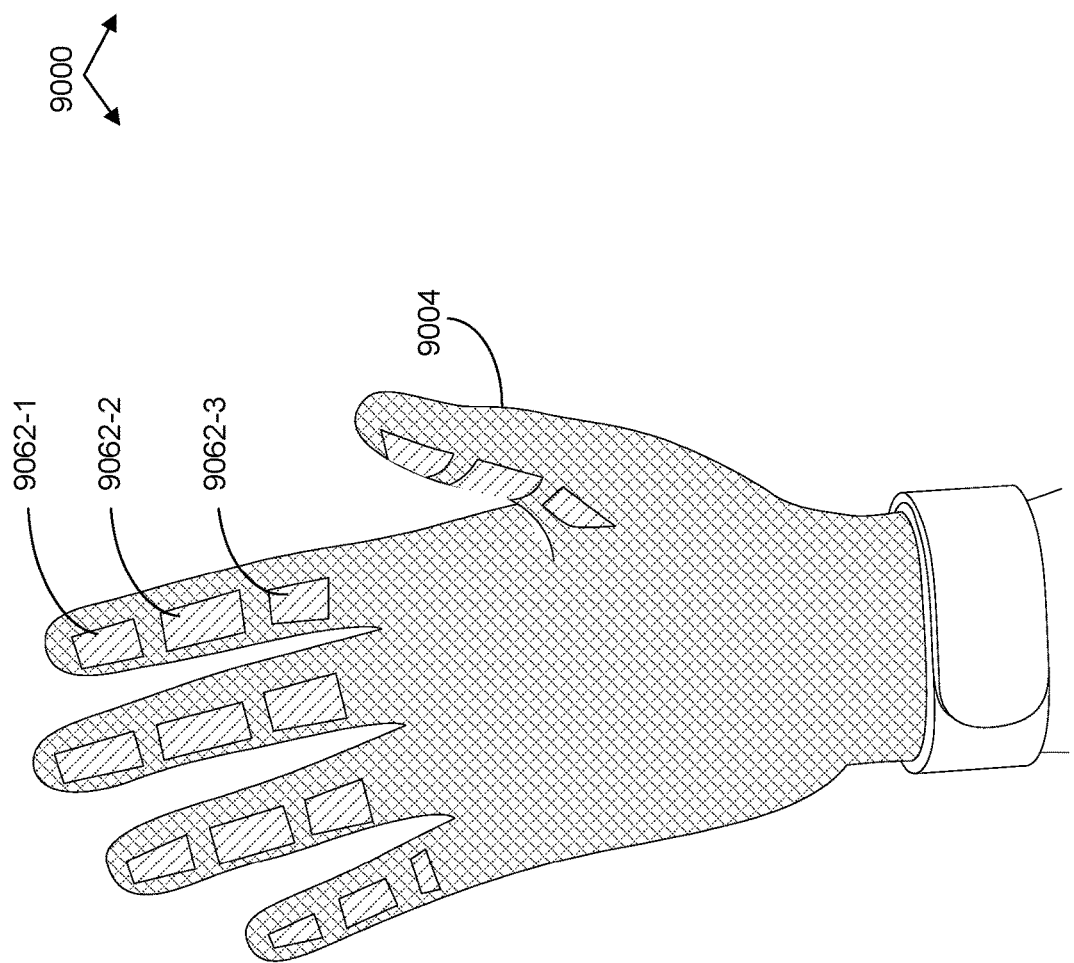

FIGS. 10A and 10B show example haptic feedback systems (e.g., hand-wearable devices) for providing feedback to a user regarding the user's interactions with a computing system (e.g., an artificial-reality environment presented by the AR system 7000 or the VR system 7010). In some embodiments, a computing system (e.g., the AR system 5000d) may also provide feedback to one or more users based on an action that was performed within the computing system and/or an interaction provided by the AR system (e.g., which may be based on instructions that are executed in conjunction with performing operations of an application of the computing system). Such feedback may include visual and/or audio feedback and may also include haptic feedback provided by a haptic assembly, such as one or more haptic assemblies 9062 of the device 9000 (e.g., haptic assemblies 9062-1, 9062-2, and 9062-3). For example, the haptic feedback may prevent (or, at a minimum, hinder/resist movement of) one or more fingers of a user from bending past a certain point to simulate the sensation of touching a solid coffee mug. In actuating such haptic effects, the device 9000 can change (either directly or indirectly) a pressurized state of one or more of the haptic assemblies 9062.

Each of the haptic assemblies 9062 includes a mechanism that, at a minimum, provides resistance when the respective haptic assembly 9062 is transitioned from a first pressurized state (e.g., atmospheric pressure or deflated) to a second pressurized state (e.g., inflated to a threshold pressure). Structures of haptic assemblies 9062 can be integrated into various devices configured to be in contact or proximity to a user's skin, including, but not limited to devices such as glove worn devices, body worn clothing device, and headset devices.

As noted above, the haptic assemblies 9062 described herein can be configured to transition between a first pressurized state and a second pressurized state to provide haptic feedback to the user. Due to the ever-changing nature of artificial reality, the haptic assemblies 9062 may be required to transition between the two states hundreds, or perhaps thousands of times, during a single use. Thus, the haptic assemblies 9062 described herein are durable and designed to quickly transition from state to state. To provide some context, in the first pressurized state, the haptic assemblies 9062 do not impede free movement of a portion of the wearer's body. For example, one or more haptic assemblies 9062 incorporated into a glove are made from flexible materials that do not impede free movement of the wearer's hand and fingers (e.g., an electrostatic-zipping actuator). The haptic assemblies 9062 are configured to conform to a shape of the portion of the wearer's body when in the first pressurized state. However, once in the second pressurized state, the haptic assemblies 9062 can be configured to restrict and/or impede free movement of the portion of the wearer's body (e.g., appendages of the user's hand). For example, the respective haptic assembly 9062 (or multiple respective haptic assemblies) can restrict movement of a wearer's finger (e.g., prevent the finger from curling or extending) when the haptic assembly 9062 is in the second pressurized state. Moreover, once in the second pressurized state, the haptic assemblies 9062 may take different shapes, with some haptic assemblies 9062 configured to take a planar, rigid shape (e.g., flat and rigid), while some other haptic assemblies 9062 are configured to curve or bend, at least partially.

As a non-limiting example, the device 9000 includes a plurality of haptic devices (e.g., a pair of haptic gloves, and a haptics component of a wrist-wearable device (e.g., any of the wrist-wearable devices described with respect to FIGS. 7A-7B. Each of which can include a garment component (e.g., a garment 9004) and one or more haptic assemblies coupled (e.g., physically coupled) to the garment component. For example, each of the haptic assemblies 9062-1, 9062-2, 9062-3, . . . 9062-N are physically coupled to the garment 9004 are configured to contact respective phalanges of a user's thumb and fingers. As explained above, the haptic assemblies 9062 are configured to provide haptic simulations to a wearer of the device 9000. The garment 9004 of each device 9000 can be one of various articles of clothing (e.g., gloves, socks, shirts, or pants). Thus, a user may wear multiple devices 9000 that are each configured to provide haptic stimulations to respective parts of the body where the devices 9000 are being worn.

Figure 10C:
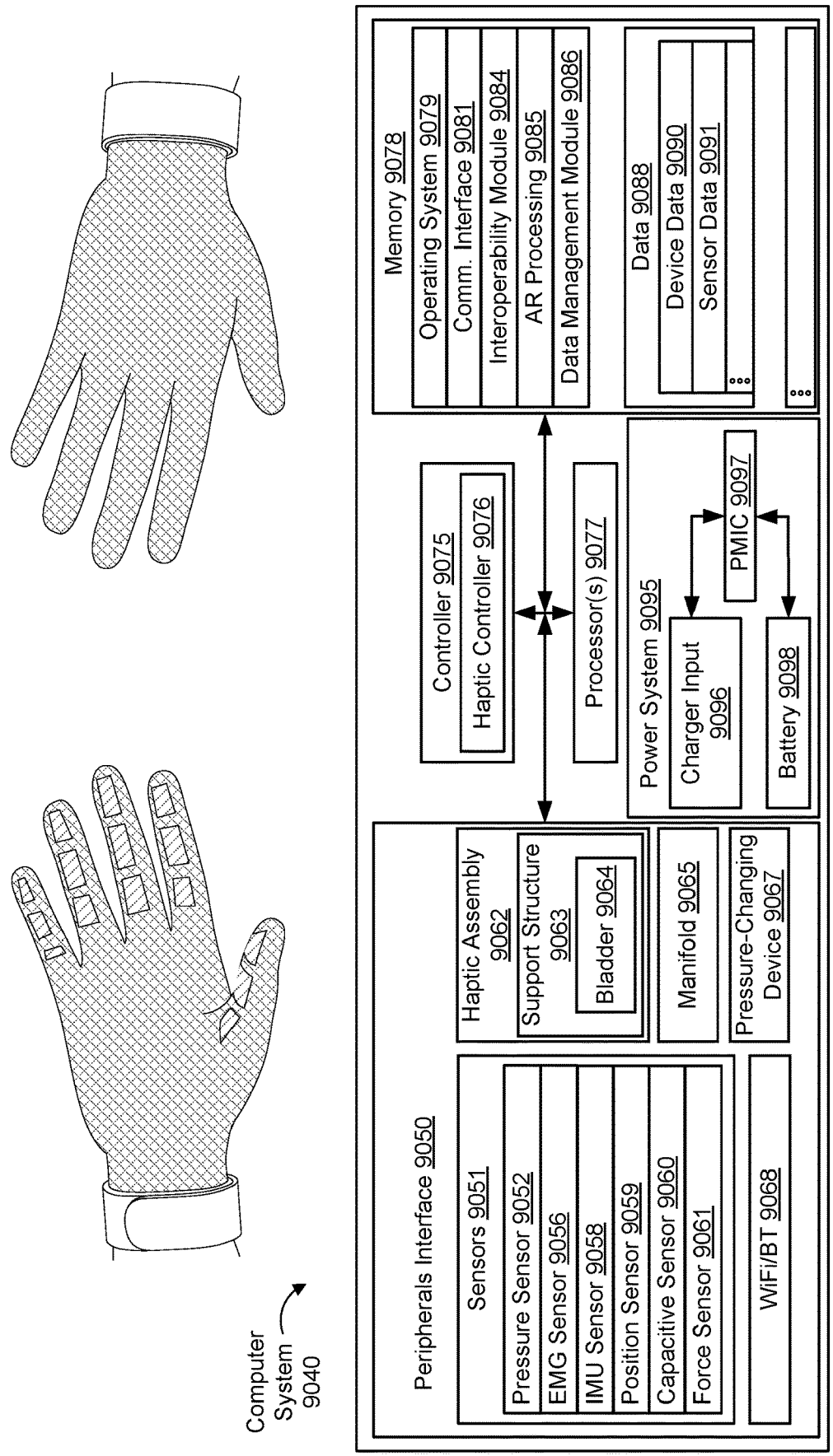

FIG. 10C shows block diagrams of a computing system 9040 of the device 9000, in accordance with some embodiments. The computing system 9040 can include one or more peripheral interfaces 9050, one or more power systems 9095, one or more controllers 9075 (including one or more haptic controllers 9076), one or more processors 9077 (as defined above, including any of the examples provided), and memory 9078, which can all be in electronic communication with each other. For example, the one or more processors 9077 can be configured to execute instructions stored in the memory 9078, which can cause a controller of the one or more controllers 9075 to cause operations to be performed at one or more peripheral devices of the peripherals interface 9050. In some embodiments, each operation described can occur based on electrical power provided by the power system 9095. The power system 9095 includes a charger input 9096, a PMIC 9097, and a battery 9098.

In some embodiments, the peripherals interface 9050 can include one or more devices configured to be part of the computing system 9040, many of which have been defined above and/or described with respect to wrist-wearable devices shown in FIGS. 7A and 7B. For example, the peripherals interface 9050 can include one or more sensors 9051. Some example sensors include: one or more pressure sensors 9052, one or more EMG sensors 9056, one or more IMU sensors 9058, one or more position sensors 9059, one or more capacitive sensors 9060, one or more force sensors 9061; and/or any other types of sensors defined above or described with respect to any other embodiments discussed herein.

In some embodiments, the peripherals interface can include one or more additional peripheral devices, including one or more Wi-Fi and/or Bluetooth devices 9068; one or more haptic assemblies 9062; one or more support structures 9063 (which can include one or more bladders 9064; one or more manifolds 9065; one or more pressure-changing devices 9067; and/or any other types of peripheral devices defined above or described with respect to any other embodiments discussed herein.

In some embodiments, each haptic assembly 9062 includes a support structure 9063, and at least one bladder 9064. The bladder 9064 (e.g., a membrane) is a sealed, inflatable pocket made from a durable and puncture resistance material, such as thermoplastic polyurethane (TPU), a flexible polymer, or the like. The bladder 9064 contains a medium (e.g., a fluid such as air, inert gas, or even a liquid) that can be added to or removed from the bladder 9064 to change a pressure (e.g., fluid pressure) inside the bladder 9064. The support structure 9063 is made from a material that is stronger and stiffer than the material of the bladder 9064. A respective support structure 9063 coupled to a respective bladder 9064 is configured to reinforce the respective bladder 9064 as the respective bladder changes shape and size due to changes in pressure (e.g., fluid pressure) inside the bladder.

The device 9000 also includes a haptic controller 9076 and a pressure-changing device 9067. In some embodiments, the haptic controller 9076 is part of the computer system 9040 (e.g., in electronic communication with one or more processors 9077 of the computer system 9040). The haptic controller 9076 is configured to control operation of the pressure-changing device 9067, and in turn operation of the device 9000. For example, the controller 9076 sends one or more signals to the pressure-changing device 9067 to activate the pressure-changing device 9067 (e.g., turn it on and off). The one or more signals may specify a desired pressure (e.g., pounds-per-square inch) to be output by the pressure-changing device 9067. Generation of the one or more signals, and in turn the pressure output by the pressure-changing device 9067, may be based on information collected by the sensors in FIGS. 6A and 6B. For example, the one or more signals may cause the pressure-changing device 9067 to increase the pressure (e.g., fluid pressure) inside a haptic assembly 9062 at a first time, based on the information collected by the sensors in FIGS. 6A and 6B (e.g., the user makes contact with an artificial coffee mug). Then, the controller may send one or more additional signals to the pressure-changing device 9067 that cause the pressure-changing device 9067 to further increase the pressure inside the haptic assembly 9062 at a second time after the first time, based on additional information collected by the sensors 9051. Further, the one or more signals may cause the pressure-changing device 9067 to inflate one or more bladders 9064 in a device 9000-A, while one or more bladders 9064 in a device 9000-B remain unchanged. Additionally, the one or more signals may cause the pressure-changing device 9067 to inflate one or more bladders 9064 in a device 9000-A to a first pressure and inflate one or more other bladders 9064 in the device 9000-A to a second pressure different from the first pressure. Depending on the number of devices 9000 serviced by the pressure-changing device 9067, and the number of bladders therein, many different inflation configurations can be achieved through the one or more signals and the examples above are not meant to be limiting.

The device 9000 may include an optional manifold 9065 between the pressure-changing device 9067 and the devices 9000. The manifold 9065 may include one or more valves (not shown) that pneumatically couple each of the haptic assemblies 9062 with the pressure-changing device 9067 via tubing. In some embodiments, the manifold 9065 is in communication with the controller 9075, and the controller 9075 controls the one or more valves of the manifold 9065 (e.g., the controller generates one or more control signals). The manifold 9065 is configured to switchably couple the pressure-changing device 9067 with one or more haptic assemblies 9062 of the same or different devices 9000 based on one or more control signals from the controller 9075. In some embodiments, instead of using the manifold 9065 to pneumatically couple the pressure-changing device 9067 with the haptic assemblies 9062, the device 9000 may include multiple pressure-changing devices 9067, where each pressure-changing device 9067 is pneumatically coupled directly with a single (or multiple) haptic assembly 9062. In some embodiments, the pressure-changing device 9067 and the optional manifold 9065 are configured as part of one or more of the devices 9000 (not illustrated) while, in other embodiments, the pressure-changing device 9067 and the optional manifold 9065 are configured as external to the device 9000. A single pressure-changing device 9067 may be shared by multiple devices 9000.

In some embodiments, the pressure-changing device 9067 is a pneumatic device, hydraulic device, a pneudraulic device, or some other device capable of adding and removing a medium (e.g., fluid, liquid, gas) from the one or more haptic assemblies 9062.

The devices shown in FIGS. 10A to 10C may be coupled via a wired connection (e.g., via busing). Alternatively, one or more of the devices shown in FIGS. 10A to 10C may be wirelessly connected (e.g., via short-range communication signals).

The memory 9078 includes instructions and data, some or all of which may be stored as non-transitory computer-readable storage media within the memory 9078. For example, the memory 9078 can include one or more operating systems 9079; one or more communication interface applications 9081; one or more interoperability modules 9084; one or more AR processing applications 9085; one or more data management modules 9086; and/or any other types of data defined above or described with respect to any other embodiments discussed herein.

The memory 9078 also includes data 9088 which can be used in conjunction with one or more of the applications discussed above. The data 9088 can include: device data 9090; sensor data 9091; and/or any other types of data defined above or described with respect to any other embodiments discussed herein.

Turning now to some example embodiments of the methods, devices, systems, and computer-readable storage media described earlier.

(A1) In one aspect, some embodiments include a method (e.g., the method 500) of biosensing. In some embodiments, the method is performed at a wearable device (e.g., the wearable device 102) having (i) a wearable structure (e.g., the watch band 6010) configured to be worn by a user, the wearable structure having an interior surface and an exterior surface, (ii) an electrode (e.g., the electrode 204-1) at a first position on the interior surface, (iii) a reference electrode (e.g., the electrode 204-3) at a second position on the interior surface, and (iv) circuitry (e.g., the circuitry 206). The method includes: (a) detecting, via the electrode, biopotential signals (e.g., neuromuscular signals) from a biopotential pathway of the user; (b) measuring, via the circuitry, an electrical property at the reference electrode, the electrical property representing a difference between a ground potential of the wearable device and a body potential of the user; and (b) compensating, via the circuitry, in processing of the detected biopotential signals for the difference (e.g., compensating in the sensing component 330-1).

(A2) In some embodiments of A1, the electrical property is an electrical current or an electrical voltage. For example, the electrical property may be a voltage drop across a resistor connected to the reference electrode (e.g., the resistor 318).

(A3) In some embodiments of A1 or A2, the method further includes (i) detecting, via an additional electrode (e.g., the electrode 204-2), additional biopotential signals from another biopotential pathway of the user; and (ii) compensating for the difference in processing of the additional biopotential signals using the circuitry (e.g., compensating in the sensing component 330-2).

(A4) In some embodiments of any of A1-A3, the method further includes providing a compensation current from the circuitry to the user via a compensation electrode (e.g., the electrode 204-4).

(A5) In some embodiments of any of A1-A4, the circuitry comprises a current-sensing component (e.g., the resistor 318) and a current-compensation component (e.g., the current-compensation component 354).

(A6) In some embodiments of any of A1-A5, the method further includes shielding the electrode from electromagnetic interference (EMI) using a shielding component (e.g., the shielding component 362).

(A7) In some embodiments of any of A1-A6, the method further includes performing, via the electrode, one or more of: monopolar sensing, pseudo-monopolar sensing, and differential sensing of the detected biopotential signals. For example, amplifying the biopotential signal with respect to an electrical ground, amplifying the biopotential signal with respect to a reference voltage (e.g., an average of multiple biopotential signals detected by the device), or amplifying a difference between biopotential signals from the electrode and biopotential signals from an additional electrode.

(A8) In some embodiments of any of A1-A7, the method further includes identifying environmental interference based on a value of the difference. In some embodiments, the environmental interference is identified based on one or more frequencies and/or one or more amplitudes of the difference.

(A9) In some embodiments of A8, the method further includes notifying the user of the identified environmental interference, for example, providing a visual, audio, and/or tactile notification.

(B1) In another aspect, some embodiments include a wearable device (e.g., the wearable device 102) for biosensing. The wearable device includes (i) a wearable structure (e.g., the watch band 1062) configured to be worn by a user, the wearable structure having an interior surface and an exterior surface, the interior surface being configured to face a user's skin while the wearable device is being worn by the user; (ii) an electrode (e.g., the electrode 204-1) at a first position on the interior surface, the electrode configured to detect biopotential signals of the user; and (iii) a reference electrode (e.g., the electrode 204-3) at a second position on the interior surface, where the wearable device is configured to (a) measure, via the reference electrode, a difference between a ground potential of the wearable device and a body potential of the user; and (b) compensate for the difference in processing of the biopotential signals detected by the electrode. For example, the wearable device is configured to reduce or eliminate currents from non-ideal sources, including external interference sources.

(B2) In some embodiments of B1, the wearable device further includes an additional electrode (e.g., the electrode 204-2) at a third position on the interior surface, the additional electrode configured to detect additional biopotential signals of the user, and the wearable device is further configured to compensate for the difference in processing of the additional biopotential signals.

(B3) In some embodiments of B1 or B2, the wearable device further includes a compensation electrode (e.g., the electrode 204-4) at a fourth position on the interior surface, the compensation electrode configured to provide a compensation current to the user.

(B4) In some embodiments of any of B1-B3, the wearable device further includes a current-sensing component (e.g., the buffer amplifier 352) configured to sense the difference and a current-compensation component (e.g., the current-compensation component 354) configured to compensate for the difference.

(B5) In some embodiments of B4, the current-sensing component includes a sense resistor (e.g., the resistor 318). For example, the sense resistor is connected to the reference electrode and the circuitry measures a voltage across the sense resistor, the voltage being the difference between the ground potential of the wearable device and a body potential of the user. In some embodiments, the current-compensation component is configured to minimize net current flow through the sense resistor.

(B6) In some embodiments of B4 or B5, the current-compensation component includes one or more of: a buffer, an amplifier (e.g., the amplifier 360), and a controller. In some embodiments, the controller includes an operational amplifier (OpAmp). In some embodiments, the controller is an integral controller, a proportional-integral controller, or a proportional-integral-derivative (PID) controller.

(B7) In some embodiments of any of B1-B6, the wearable device further includes a shielding component (e.g., the shielding component 362) configured to shield the electrode from EMI.

(B8) In some embodiments of B7, the shielding component is coupled to the reference electrode, and the wearable device is further configured to compensate in the biopotential signals for parasitic current from the shielding component. In some embodiments, the shielding component is coupled to an electrical ground of the wearable device. In some embodiments, the shielding component is coupled to a node representing an average of signals from electrodes of the wearable device.

(B9) In some embodiments of any of B1-B8, the wearable device further includes circuitry (e.g., the sensing component 330-1) coupled to the electrode, the circuitry configured for one or more of monopolar sensing, pseudo-monopolar sensing, and differential sensing of the detected biopotential signals. In some embodiments, the circuitry is configured to compare the biopotential signals detected by the electrode to a reference signal to allow for a determination of a motor action that the user intends to perform. For example, the reference signal is a ground signal or a reference biopotential signal (e.g., an average biopotential signal or a biopotential signal from an electrode). In some embodiments, the circuitry (e.g., the differential amplifier 314) is configured to compare the biopotential signals detected by the electrode to additional biopotential signals detected by a second electrode to allow for a determination of a motor action that the user intends to perform, for example, to obtain a differential biopotential signal for use in identifying motor actions. An example motor action includes a hand, arm, and/or leg gesture.

(B10) In some embodiments of any of B1-B9, the difference between the ground potential of the wearable device and the body potential of the user is caused at least in part by one or more parasitic currents and/or one or more bias currents. For example, bias currents that flow from analog front-end components to the reference electrode. In some embodiments, the difference is caused at least in part by environmental interference, such as EMI from a power line, power source, or other electric or electronic source.

(B11) In some embodiments of any of B1-B10, the wearable device further includes circuitry (e.g., the current-compensation component 322) configured to measure the difference and compensate for the difference in processing of the biopotential signals; and an energy storage device configured to supply power to the circuitry. In some embodiments, the wearable device is a battery-powered device.

(B12) In some embodiments of any of B1-B11, the wearable device is further configured to identify environmental interference based on the difference.

(B13) In some embodiments of B12, the wearable device is configured to notify the user of the environmental interference. For example, the wearable device presents a notification to the user that the user is in a high-interference environment and/or has an improper coupling between the user's skin and the wearable device. A high-interference environment may be due to a nearby power source, power charging device, cellular tower, or other electronic devices.

(B14) In some embodiments of any of B1-B13, the biopotential signals include neuromuscular signals.

(B15) In some embodiments of any of B1-B14, the second position on the interior surface is adjacent to an ulna bone of the user while the wearable device is worn by the user. For example, the reference electrode is located at a position that does not receive biopotential signals needed to interpret user actions and/or gestures. In some embodiments, the second position is adjacent to a center dorsal side of the user's wrist while the wearable device is worn by the user.

(B16) In some embodiments of any of B1-B15, the wearable device is further configured to identify a motor action that the user intends to perform based on the biopotential signals. For example, the motor action is a user gesture (e.g., an in-air hand gesture).

(B17) In some embodiments of B16, the reference electrode is not used to identify the motor action (e.g., the reference electrode does not have a corresponding output 316 for the controller 208). For example, the signals detected by the reference electrode are used for ground compensation, but not used for interpreting hand gestures or other motor actions.

(B18) In some embodiments of any of B1-B17, the wearable device is configured to directly measure the difference between the ground potential of the wearable device and the body potential of the user via an output of the reference electrode. For example, the difference is measured prior to any amplification or modification.

In some embodiments, the wearable device detects neuromuscular signals travelling through the user's neck or back, which can be done using neuromuscular-signal sensors coupled with the VR goggles or the AR glasses in some example embodiments.

In another aspect, some embodiments include a computing system comprising one or more processors and memory coupled to the one or more processors, the memory storing one or more programs configured to be executed by the one or more processors, the one or more programs including instructions for performing any of the methods described herein (e.g., the method 500 and A1-A9 above).

In yet another aspect, some embodiments include a non-transitory computer-readable storage medium storing one or more programs for execution by one or more processors of a computing system, the one or more programs including instructions for performing any of the methods described herein (e.g., the method 500 and A1-A9 above).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt into or opt out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A wearable device for biosensing, the wearable device comprising:
    a wearable structure configured to be worn by a user, the wearable structure having an interior surface and an exterior surface, the interior surface being configured to face a user's skin while the wearable device is being worn by the user;
    a first electrode at a first position on the interior surface, the first electrode configured to detect biopotential signals of the user;
    a second electrode at a second position on the interior surface; and
    a shielding component configured to shield the first electrode from electromagnetic interference (EMI) and coupled to the second electrode;
    wherein the wearable device is configured to (i) measure, via the second electrode, a difference between a ground potential of the wearable device and a body potential of the user, and (ii) generate a compensation current applied to a body of the user to compensate for the difference in processing of the biopotential signals detected by the first electrode and for electrical characteristics associated with the shielding component.

2. The wearable device of claim 1, further comprising an additional electrode at a third position on the interior surface, the additional electrode configured to detect additional biopotential signals of the user; and
    wherein the wearable device is further configured to compensate for the difference in processing of the additional biopotential signals.

3. The wearable device of claim 1, further comprising a compensation electrode at a fourth position on the interior surface, the compensation electrode configured to provide the generated compensation current to the body of the user.

4. The wearable device of claim 1, wherein the wearable device further comprises a current-sensing component configured to sense the difference and a current-compensation component configured to compensate for the difference.

5. The wearable device of claim 4, wherein the current-compensation component comprises one or more of: a buffer, an amplifier, and a controller.

6. The wearable device of claim 1, wherein the electrical characteristics comprise a parasitic current from the shielding component.

7. The wearable device of claim 1, further comprising circuitry coupled to the first electrode, the circuitry configured for one or more of: monopolar sensing, pseudo-monopolar sensing, and differential sensing of the detected biopotential signals.

8. The wearable device of claim 1, wherein the difference between the ground potential of the wearable device and the body potential of the user is caused at least in part by one or more parasitic currents and/or one or more bias currents.

9. The wearable device of claim 1, further comprising:
    circuitry configured to measure the difference and compensate for the difference in processing of the biopotential signals; and
    an energy storage device configured to supply power to the circuitry.

10. The wearable device of claim 1, wherein the wearable device is further configured to identify environmental interference based on the difference.

11. The wearable device of claim 1, wherein the second position on the interior surface is adjacent to an ulna bone of the user while the wearable device is worn by the user.

12. The wearable device of claim 1, wherein the wearable device is further configured to identify a motor action that the user intends to perform based on the biopotential signals.

13. The wearable device of claim 12, wherein the second electrode is not used to identify the motor action.

14. The wearable device of claim 1, wherein the wearable device is configured to directly measure the difference between the ground potential of the wearable device and the body potential of the user via an output of the second electrode.

15. A method of reducing noise in biosensing, the method comprising:
    at a wearable device having (i) a wearable structure configured to be worn by a user, the wearable structure having an interior surface and an exterior surface, (ii) a first electrode at a first position on the interior surface, (iii) a second electrode at a second position on the interior surface, (iv) a shielding component configured to shield the first electrode from electromagnetic interference (EMI) and coupled to the second electrode, and (v) circuitry:
    detecting, via the first electrode, biopotential signals from a biopotential pathway of the user;
    measuring, via the circuitry, an electrical property at the second electrode, the electrical property representing a difference between a ground potential of the wearable device and a body potential of the user; and
    generating a compensation current applied to a body of the user, via the circuitry, to compensate for the difference in processing of the detected biopotential signals and for electrical characteristics associated with the shielding component.

16. The method of claim 15, further comprising:
    detecting, via an additional electrode, additional biopotential signals from another biopotential pathway of the user; and
    compensating for the difference in processing of the additional biopotential signals using the circuitry.

17. The method of claim 15, further comprising providing the generated compensation current from the circuitry to the body of the user via a compensation electrode.

18. The method of claim 15, wherein the circuitry comprises a current-sensing component and a current-compensation component.

19. The method of claim 15, further comprising performing, via the first electrode, one or more of: monopolar sensing, pseudo-monopolar sensing, and differential sensing of the detected biopotential signals.

20. The method of claim 15, further comprising identifying environmental interference based on the difference.

* * * * *